US012690009B2

(12) United States Patent　　　(10) Patent No.:　US 12,690,009 B2
　　Qureshi et al.　　　　　　　　　(45) Date of Patent:　　Jul. 21, 2026

(54) ELEVATION ESTIMATION FOR DETERMINING OPERATING CHANNELS AND TRANSMISSION PARAMETERS

(71) Applicant: QUALCOMM Incorporated, San Diego, CA (US)

(72) Inventors: Ahmed Owais Qureshi, San Jose, CA (US); Tevfik Yucek, San Jose, CA (US); Vincent Knowles Jones, Redwood City, CA (US); Matthew Tornquist, San Jose, CA (US); Zhiqun Liu, Foster City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 529 days.

(21) Appl. No.: 18/053,715

(22) Filed: Nov. 8, 2022

(65) Prior Publication Data

US 2024/0155549 A1　　May 9, 2024

(51) Int. Cl.
H04W 4/02　　　(2018.01)
H04W 52/28　　(2009.01)
H04W 64/00　　(2009.01)

(52) U.S. Cl.
CPC ......... H04W 64/006 (2013.01); H04W 52/28 (2013.01)

(58) Field of Classification Search
CPC ..... H04W 64/006; H04W 52/28; H04W 4/33; H04W 4/022; H04W 4/023; H04W 4/50; H04W 4/38; H04W 64/00; H04W 4/02
See application file for complete search history.

(56) References Cited

U.S. PATENT DOCUMENTS

| 12,120,532 | B2 * | 10/2024 | Tsuboi | ...................... G06T 7/70 |
| 2015/0249907 | A1 | 9/2015 | Gupta et al. | |
| 2021/0400615 | A1 * | 12/2021 | Smith | ................... H04W 48/16 |
| 2022/0141681 | A1 | 5/2022 | Flesch | |
| 2022/0253803 | A1 * | 8/2022 | White | ......................... G08G 5/34 |
| 2022/0295293 | A1 * | 9/2022 | Tsuboi | ....................... G06T 7/70 |
| 2023/0109847 | A1 * | 4/2023 | Gurusamy | ............... G08G 5/53 |
| | | | | 701/9 |

(Continued)

OTHER PUBLICATIONS

International Search Report and Written Opinion—PCT/US2023/074105—ISA/EPO—Oct. 31, 2023 (2300599WO).

*Primary Examiner* — Khawar Iqbal

(74) *Attorney, Agent, or Firm* — Holland & Hart LLP

(57)　　　　　ABSTRACT

This disclosure provides methods, components, devices and systems for wireless communications. Some aspects more specifically relate to elevation estimation for determining operating channels and transmission parameters. A wireless communication device, such as a cloud service, may receive geolocation information of an access point (AP). Additionally, or alternatively, the wireless communication device may receive air pressure and temperature information of the AP. Using the geolocation information and building datasets including locations and heights of buildings surrounding the AP, the wireless communication device may identify a highest building and based on its, height estimate an elevation of the AP. Based on the estimated building height and elevation, the wireless communication device may determine a set of transmission parameters for the AP and transmit an indication of the set to the AP.

28 Claims, 12 Drawing Sheets

(56)        References Cited

U.S. PATENT DOCUMENTS

| | | | | |
|---|---|---|---|---|
| 2023/0231639 | A1* | 7/2023 | Khalid | H04B 17/253 |
| | | | | 455/446 |
| 2024/0069244 | A1* | 2/2024 | Dormody | G01C 5/06 |
| 2024/0080778 | A1* | 3/2024 | Strater | H04W 52/367 |
| 2024/0110799 | A1* | 4/2024 | Beaurepaire | G01C 21/383 |
| 2024/0259831 | A1* | 8/2024 | Cavcic | H04W 16/18 |
| 2024/0406750 | A1* | 12/2024 | Chandra | G01S 5/0244 |
| 2025/0150185 | A1* | 5/2025 | Khalid | H04B 17/347 |
| 2025/0209925 | A1* | 6/2025 | Hayashi | G08G 5/55 |
| 2025/0283733 | A1* | 9/2025 | Dormody | G01C 5/06 |

* cited by examiner

400

500

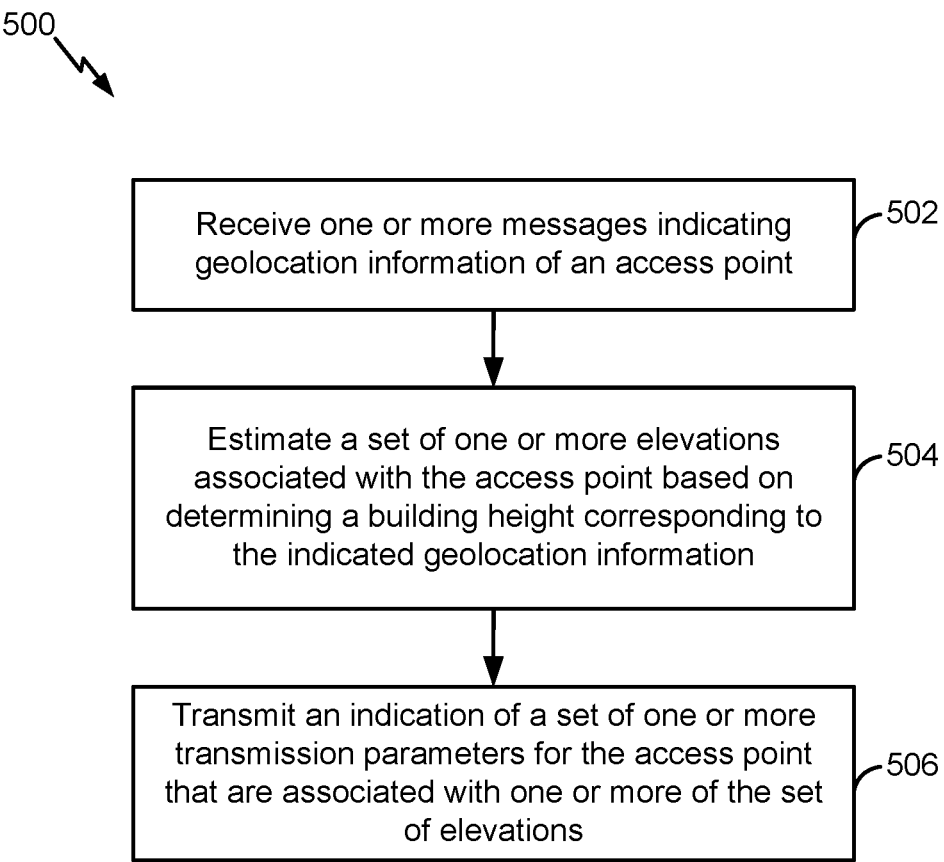

502
Receive one or more messages indicating geolocation information of an access point 504
Estimate a set of one or more elevations associated with the access point based on determining a building height corresponding to the indicated geolocation information 506
Transmit an indication of a set of one or more transmission parameters for the access point that are associated with one or more of the set of elevations

700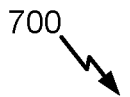

Transmit one or more messages indicating geolocation information of the access point and indicating a set of one or more elevations associated with the access point based on the geolocation information

702

Receive an indication of a set of one or more transmission parameters for the access point from a wireless device based on the indicated geolocation information and the set of elevations, the set of elevations based on a determined building height

800

```
┌─────────────────────────────────────────┐
│ Transmit one or more messages indicating │
│ geolocation information of the access point and │
│ indicating a set of one or more elevations │  802
│ associated with the access point based on the │
│ geolocation information │
└─────────────────────────────────────────┘
```

Transmit one or more messages indicating geolocation information of the access point and indicating a set of one or more elevations associated with the access point based on the geolocation information ⟋802

Receive an indication of the set of elevations associated with the access point from the wireless device, the indication of the set of elevations including an uncertainty associated with a respective elevation of the set of elevations ⟋804

Receive an indication of a set of one or more transmission parameters for the access point from a wireless device based on the indicated geolocation information and the set of elevations, the set of elevations based on a determined building height ⟋806

Figure 8

900

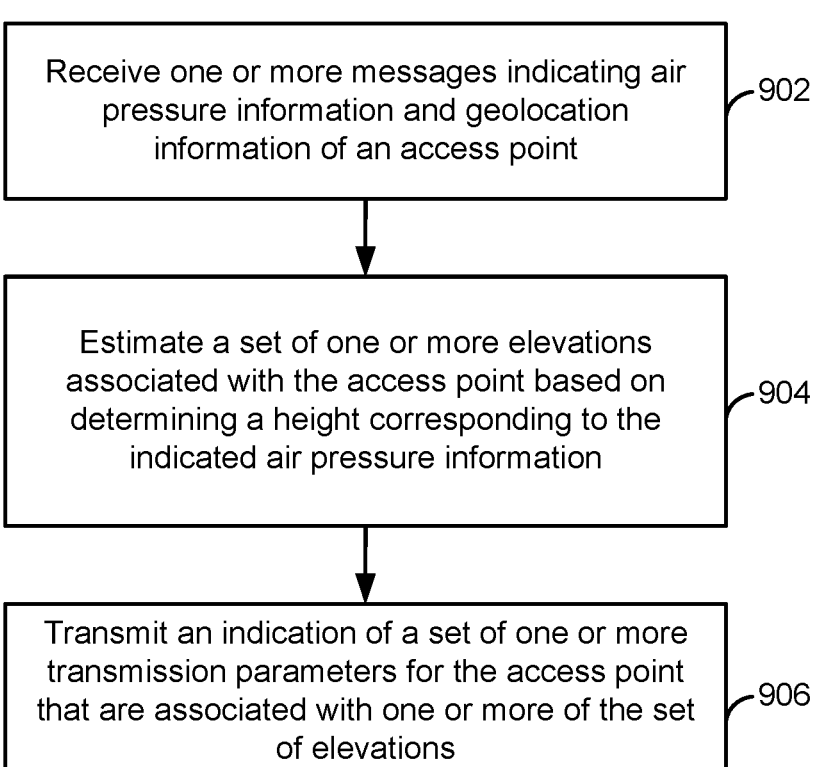

Receive one or more messages indicating air pressure information and geolocation information of an access point ⟋902

Estimate a set of one or more elevations associated with the access point based on determining a height corresponding to the indicated air pressure information ⟋904

Transmit an indication of a set of one or more transmission parameters for the access point that are associated with one or more of the set of elevations ⟋906

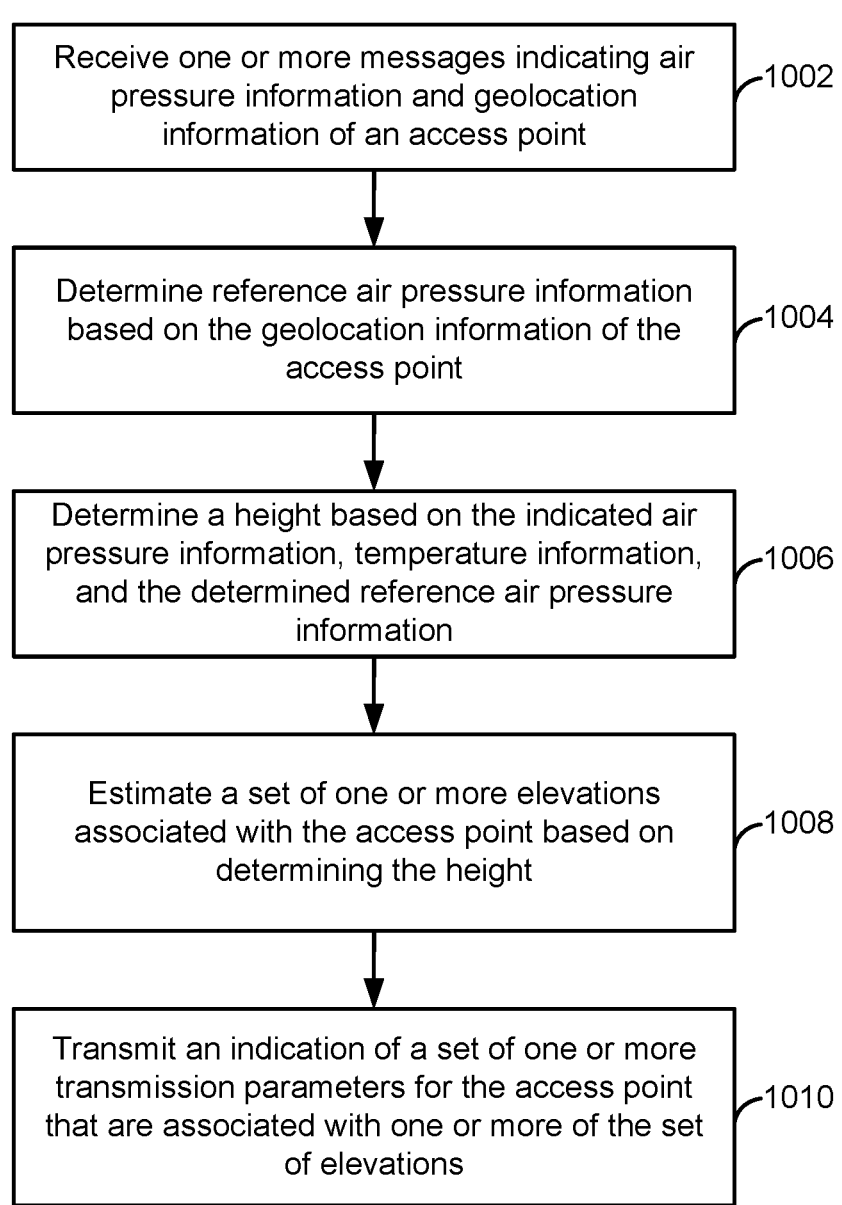

Receive one or more messages indicating air pressure information and geolocation information of an access point ⌐1002

Determine reference air pressure information based on the geolocation information of the access point ⌐1004

Determine a height based on the indicated air pressure information, temperature information, and the determined reference air pressure information ⌐1006

Estimate a set of one or more elevations associated with the access point based on determining the height ⌐1008

Transmit an indication of a set of one or more transmission parameters for the access point that are associated with one or more of the set of elevations ⌐1010

Geolocation
Information
Component
1202

Transmission
Parameter
Component
1204

Signaling
Component
1206

Elevation
Indication
Component
1208

ELEVATION ESTIMATION FOR DETERMINING OPERATING CHANNELS AND TRANSMISSION PARAMETERS

TECHNICAL FIELD

This disclosure relates generally to wireless communication, and more specifically, to estimating an elevation of an access point (AP) for determining operating channels and transmission parameters.

DESCRIPTION OF THE RELATED TECHNOLOGY

A wireless local area network (WLAN) may be formed by one or more wireless access points (APs) that provide a shared wireless communication medium for use by multiple client devices also referred to as wireless stations (STAs). The basic building block of a WLAN conforming to the Institute of Electrical and Electronics Engineers (IEEE) 802.11 family of standards is a Basic Service Set (BSS), which is managed by an AP. Each BSS is identified by a Basic Service Set Identifier (BSSID) that is advertised by the AP. An AP periodically broadcasts beacon frames to enable any STAs within wireless range of the AP to establish or maintain a communication link with the WLAN.

In some WLANs, an AP may operate using different frequencies and power levels based on a geolocation associated with the AP. For example, an AP may provide location information (for example, in terms of latitude coordinates, longitude coordinates, and/or elevation) to a wireless communication device, and the wireless communication device may use the location information to determine available frequencies and power levels that the AP may use. In some aspects, the AP may determine its elevation using global positioning system (GPS) hardware or other specialized hardware that may increase costs and complexity of the AP, among other disadvantages.

SUMMARY

The systems, methods and devices of this disclosure each have several innovative aspects, no single one of which is solely responsible for the desirable attributes disclosed herein.

One innovative aspect of the subject matter described in this disclosure can be implemented in a method for wireless communication. The method may include receiving one or more messages indicating geolocation information of an access point (AP), estimating a set of one or more elevations associated with the AP based on determining a building height corresponding to the indicated geolocation information, and transmitting an indication of a set of one or more transmission parameters for the AP that are associated with one or more of the set of elevations.

One/another innovative aspect of the subject matter described in this disclosure can be implemented in an apparatus for wireless communication. The apparatus may include a processor, and memory coupled with the processor and storing instructions. The instructions may be executable by the processor to cause the apparatus to receive one or more messages indicating geolocation information of an AP, estimate a set of one or more elevations associated with the AP based on determining a building height corresponding to the indicated geolocation information, and transmit an indication of a set of one or more transmission parameters for the AP that are associated with one or more of the set of elevations.

One/another innovative aspect of the subject matter described in this disclosure can be implemented in an apparatus for wireless communication. The apparatus may include means for receiving one or more messages indicating geolocation information of an AP, means for estimating a set of one or more elevations associated with the AP based on determining a building height corresponding to the indicated geolocation information, and means for transmitting an indication of a set of one or more transmission parameters for the AP that are associated with one or more of the set of elevations.

One/another innovative aspect of the subject matter described in this disclosure can be implemented in a non-transitory computer-readable medium storing code for wireless communication at a wireless communication device. The code may include instructions executable by a processor to receive one or more messages indicating geolocation information of an AP, estimate a set of one or more elevations associated with the AP based on determining a building height corresponding to the indicated geolocation information, and transmit an indication of a set of one or more transmission parameters for the AP that are associated with one or more of the set of elevations.

Some examples of the method, apparatuses, and non-transitory computer-readable medium described herein may further include operations, features, means, or instructions for transmitting an indication of the geolocation information to the AP in response to receiving the one or more messages based on retrieving the geolocation information from a database.

Some examples of the method, apparatuses, and non-transitory computer-readable medium described herein may further include operations, features, means, or instructions for transmitting an indication of the set of elevations associated with the AP based on estimating the set of elevations, the indication of the set of elevations including an uncertainty associated with a respective elevation of the set of elevations.

In some examples of the method, apparatuses, and non-transitory computer-readable medium described herein, the set of one or more transmission parameters includes one or more transmit powers, one or more channels for the AP associated with the transmit power, or one or more frequencies for the AP associated with the transmit power, or any combination thereof.

One/another innovative aspect of the subject matter described in this disclosure can be implemented in a method for wireless communication. The method may include transmitting one or more messages indicating geolocation information of the AP and indicating a set of one or more elevations associated with the AP based on the geolocation information and receiving an indication of a set of one or more transmission parameters for the AP from a wireless communication device based on the indicated geolocation information and the set of elevations, the set of elevations based on a determined building height.

One/another innovative aspect of the subject matter described in this disclosure can be implemented in an apparatus for wireless communication. The apparatus may include a processor, and memory coupled with the processor and storing instructions. The instructions may be executable by the processor to cause the apparatus to transmit one or more messages indicating geolocation information of the AP and indicating a set of one or more elevations associated with the AP based on the geolocation information and receive an indication of a set of one or more transmission parameters for the AP from a wireless communication device based on the indicated geolocation information and the set of elevations, the set of elevations based on a determined building height.

One/another innovative aspect of the subject matter described in this disclosure can be implemented in an apparatus for wireless communication. The apparatus may include means for transmitting one or more messages indicating geolocation information of the AP and indicating a set of one or more elevations associated with the AP based on the geolocation information and means for receiving an indication of a set of one or more transmission parameters for the AP from a wireless communication device based on the indicated geolocation information and the set of elevations, the set of elevations based on a determined building height.

One/another innovative aspect of the subject matter described in this disclosure can be implemented in a non-transitory computer-readable medium storing code for wireless communication. The code may include instructions executable by a processor to transmit one or more messages indicating geolocation information of the AP and indicating a set of one or more elevations associated with the AP based on the geolocation information and receive an indication of a set of one or more transmission parameters for the AP from a wireless communication device based on the indicated geolocation information and the set of elevations, the set of elevations based on a determined building height.

Some examples of the method, apparatuses, and non-transitory computer-readable medium described herein may further include operations, features, means, or instructions for receiving an indication of the geolocation information retrieved from a database from the wireless communication device in response to transmitting the one or more messages.

One/another innovative aspect of the subject matter described in this disclosure can be implemented in a method for wireless communication. The method may include receiving one or more messages indicating air pressure information and geolocation information of an AP, estimating a set of one or more elevations associated with the AP based on determining a height corresponding to the indicated air pressure information, and transmitting an indication of a set of one or more transmission parameters for the AP that are associated with one or more of the set of elevations.

One/another innovative aspect of the subject matter described in this disclosure can be implemented in an apparatus for wireless communication. The apparatus may include a processor, memory coupled with the processor, and instructions stored in the memory. The instructions may be executable by the processor to cause the apparatus to receive one or more messages indicating air pressure information and geolocation information of an AP, estimate a set of one or more elevations associated with the AP based on determining a height corresponding to the indicated air pressure information, and transmit an indication of a set of one or more transmission parameters for the AP that are associated with one or more of the set of elevations.

One/another innovative aspect of the subject matter described in this disclosure can be implemented in an apparatus for wireless communication. The apparatus may include means for receiving one or more messages indicating air pressure information and geolocation information of an AP, means for estimating a set of one or more elevations associated with the AP based on determining a height corresponding to the indicated air pressure information, and means for transmitting an indication of a set of one or more transmission parameters for the AP that are associated with one or more of the set of elevations.

One/another innovative aspect of the subject matter described in this disclosure can be implemented in a non-transitory computer-readable medium storing code for wireless communication at a wireless communication device. The code may include instructions executable by a processor to receive one or more messages indicating air pressure information and geolocation information of an AP, estimate a set of one or more elevations associated with the AP based on determining a height corresponding to the indicated air pressure information, and transmit an indication of a set of one or more transmission parameters for the AP that are associated with one or more of the set of elevations.

Some examples of the method, apparatuses, and non-transitory computer-readable medium described herein may further include operations, features, means, or instructions for receiving the one or more message indicating the air pressure information, the geolocation information, and temperature information of the AP, the determined height corresponding to the indicated air pressure information and the indicated temperature information.

Some examples of the method, apparatuses, and non-transitory computer-readable medium described herein may further include operations, features, means, or instructions for determining reference air pressure information based on the geolocation information of the AP and determining the height based on the indicated air pressure information, temperature information, and the determined reference air pressure information.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIGS. 5 and 6 show flowcharts illustrating example processes performable by a wireless communication device that support elevation estimation for determining operating channels and transmission parameters.

FIGS. 7 through 10 show flowcharts illustrating example processes performable by a wireless communication device that support elevation estimation for determining operating channels and transmission parameters.

Like reference numbers and designations in the various drawings indicate like elements.

DETAILED DESCRIPTION

Figure 1:
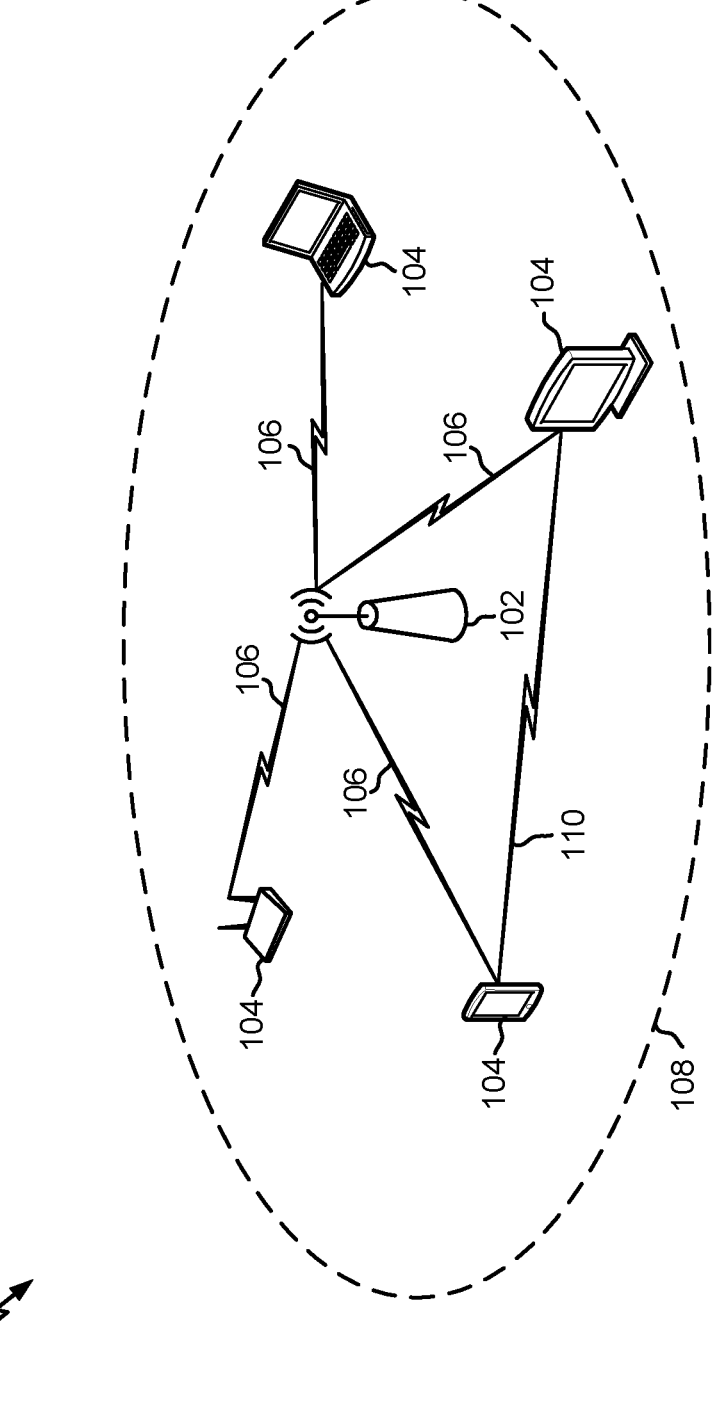
FIG. 1 shows a pictorial diagram of an example wireless communication network that supports elevation estimation for determining operating channels and transmission parameters.

The following description is directed to some particular examples for the purposes of describing innovative aspects of this disclosure. However, a person having ordinary skill in the art will readily recognize that the teachings herein can be applied in a multitude of different ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3$^{rd}$ Generation Partnership Project (3GPP), among others. The described examples can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also can be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IOT) network.

A wireless communication device, such as a wireless access point (AP) or otherwise a fixed location wireless communication device, may use particular frequencies, channels, and power levels based on respective geolocation information. For example, an AP may provide location information (such as longitude coordinates and latitude coordinates) and elevation information (such as a z-axis height) to a wireless communication device that may use the location information and the elevation information to determine a transmit power to be used by the AP. Conventionally, the AP would generally use dedicated hardware such as a global positioning system (GPS) or other dedicated hardware to determine the elevation information. Such hardware, however, may increase installation and operating costs as well as a complexity of the AP, among other disadvantages.

Various aspects generally relate to estimating an elevation of a wireless communication device, such as an AP, for determining one or more frequency channels and transmission parameters. Some aspects more specifically relate to leveraging three-dimensional (3D) building data to determine one or more building heights and to estimate an elevation of an AP based on the one or more building heights. In some examples, the AP may transmit geolocation information to a wireless communication device, system or network entity, which may implement a cloud service (for example, one or more wireless communication devices may work in conjunction to function as a remote cloud service).

Additionally, or alternatively, the AP may transmit air pressure information, temperature information, or both, to the wireless communication device.

The wireless communication device may access a database of 3D building data and, using the geolocation information, identify a building that the AP is located in and/or one or more buildings that the AP is located near (such as one or more building that surround a building that the AP is located in), and obtain a respective height of the building or buildings. In some examples, the wireless communication device may identify a maximum height (such as a height of a tallest one of the buildings) of the identified heights associated with surrounding buildings. For example, based on the geolocation information of the AP, which may include longitude and latitude coordinates among other information, the wireless communication device may pre-process a set of building data that includes relative or absolute locations and heights of buildings within a defined geographical area of or proximity to the AP. Additionally, or alternatively, the wireless communication device may use the air pressure information, the temperature information, or both, to determine a maximum building height near or otherwise associated with a location of the AP.

Using the determined building height, the wireless communication device may identify or estimate a set of one or more elevations associated with the position of the AP (instead of using dedicated hardware such as a GPS or a barometric pressure sensor). That is, whether the AP is located inside or outside of a building, the wireless communication device may relate the determined building height to a set of one or more elevations of the AP and estimate that the AP may be located at any elevation between ground level (for example, 0 m) and the maximum building height. In some aspects, the wireless communication device may then determine a set of one or more transmission parameters, such as a transmit power, for the AP to use based on the estimated building height and corresponding set of one or more elevations, and the wireless communication device may transmit an indication of the set of transmission parameters to the AP for use. Additionally, or alternatively, the wireless communication device may permit operating channels or disallow operating channels the AP may use with a given transmit power.

Particular aspects of the subject matter described in this disclosure may be implemented to realize one or more of the following potential advantages. In some examples, determining an elevation of an AP based on estimated heights of buildings surrounding the AP may reduce cost and complexity of the AP. For example, a wireless communication device may use geolocation information of the AP and 3D building data (such as building locations and heights) to estimate an elevation of the AP instead of using dedicated and more expensive hardware, such as GPS and barometric pressure hardware. This may reduce the cost of operating and installing the AP and reduce the complexity of the AP because such hardware may be removed or omitted at installation. Additionally, or alternatively, the wireless communication device may determine available frequencies, channels, transmit powers, and other operating parameters of the AP based on the estimated building heights and corresponding AP elevation by using this additional information to more accurately determine various characteristics. As such, aspects of the present disclosure may improve power and resource efficiency of the AP without diminishing performance, among other benefits.

FIG. 1 shows a block diagram of an example wireless communication network 100. According to some aspects, the wireless communication network 100 can be an example of a wireless local area network (WLAN) such as a Wi-Fi network (and will hereinafter be referred to as WLAN 100). For example, the WLAN 100 can be a network implementing at least one of the IEEE 802.11 family of wireless communication protocol standards (such as that defined by the IEEE 802.11-2020 specification or amendments thereof including, but not limited to, 802.11ay, 802.11ax, 802.11az, 802.11ba, 802.11bd, 802.11be, 802.11bf, and the 802.11 amendment associated with Wi-Fi 8). The WLAN 100 may include numerous wireless communication devices such as a wireless AP 102 and multiple wireless STAs 104. While only one AP 102 is shown in FIG. 1, the WLAN network 100 also can include multiple APs 102. AP 102 shown in FIG. 1 can represent various different types of APs including but not limited to enterprise-level APs, single-frequency APs, dual-band APs, standalone APs, software-enabled APs (soft APs), and multi-link APs. The coverage area and capacity of a cellular network (such as LTE, 5G NR, etc.) can be further improved by a small cell which is supported by an AP serving as a miniature base station. Furthermore, private cellular networks also can be set up through a wireless area network using small cells.

Each of the STAs 104 also may be referred to as a mobile station (MS), a mobile device, a mobile handset, a wireless handset, an access terminal (AT), a user equipment (UE), a subscriber station (SS), or a subscriber unit, among other examples. The STAs 104 may represent various devices such as mobile phones, personal digital assistant (PDAs), other handheld devices, netbooks, notebook computers, tablet computers, laptops, chromebooks, extended reality (XR) headsets, wearable devices, display devices (for example, TVs (including smart TVs), computer monitors, navigation systems, among others), music or other audio or stereo devices, remote control devices ("remotes"), printers, kitchen appliances (including smart refrigerators) or other household appliances, key fobs (for example, for passive keyless entry and start (PKES) systems), Internet of Things (IoT) devices, and vehicles, among other examples. The various STAs 104 in the network are able to communicate with one another via the AP 102.

A single AP 102 and an associated set of STAs 104 may be referred to as a basic service set (BSS), which is managed by the respective AP 102. FIG. 1 additionally shows an example coverage area 108 of the AP 102, which may represent a basic service area (BSA) of the WLAN 100. The BSS may be identified or indicated to users by a service set identifier (SSID), as well as to other devices by a basic service set identifier (BSSID), which may be a medium access control (MAC) address of the AP 102. The AP 102 may periodically broadcast beacon frames ("beacons") including the BSSID to enable any STAs 104 within wireless range of the AP 102 to "associate" or re-associate with the AP 102 to establish a respective communication link 106 (hereinafter also referred to as a "Wi-Fi link"), or to maintain a communication link 106, with the AP 102. For example, the beacons can include an identification or indication of a primary channel used by the respective AP 102 as well as a timing synchronization function for establishing or maintaining timing synchronization with the AP 102. The AP 102 may provide access to external networks to various STAs 104 in the WLAN via respective communication links 106.

To establish a communication link 106 with an AP 102, each of the STAs 104 is configured to perform passive or active scanning operations ("scans") on frequency channels in one or more frequency bands (for example, the 2.4 GHz, 5 GHz, 6 GHz or 60 GHz bands). To perform passive scanning, a STA 104 listens for beacons, which are transmitted by respective APs 102 at a periodic time interval referred to as the target beacon transmission time (TBTT) (measured in time units (TUs) where one TU may be equal to 1024 microseconds (μs)). To perform active scanning, a STA 104 generates and sequentially transmits probe requests on each channel to be scanned and listens for probe responses from APs 102. Each STA 104 may identify, determine, ascertain, or select an AP 102 with which to associate in accordance with the scanning information obtained through the passive or active scans, and to perform authentication and association operations to establish a communication link 106 with the selected AP 102. The AP 102 assigns an association identifier (AID) to the STA 104 at the culmination of the association operations, which the AP 102 uses to track the STA 104.

As a result of the increasing ubiquity of wireless networks, a STA 104 may have the opportunity to select one of many BSSs within range of the STA or to select among multiple APs 102 that together form an extended service set (ESS) including multiple connected BSSs. An extended network station associated with the WLAN 100 may be connected to a wired or wireless distribution system that may allow multiple APs 102 to be connected in such an ESS. As such, a STA 104 can be covered by more than one AP 102 and can associate with different APs 102 at different times for different transmissions. Additionally, after association with an AP 102, a STA 104 also may periodically scan its surroundings to find a more suitable AP 102 with which to associate. For example, a STA 104 that is moving relative to its associated AP 102 may perform a "roaming" scan to find another AP 102 having more desirable network characteristics such as a greater received signal strength indicator (RSSI) or a reduced traffic load.

In some aspects, STAs 104 may form networks without APs 102 or other equipment other than the STAs 104 themselves. One example of such a network is an ad hoc network (or wireless ad hoc network). Ad hoc networks may alternatively be referred to as mesh networks or peer-to-peer (P2P) networks. In some aspects, ad hoc networks may be implemented within a larger wireless network such as the WLAN 100. In such examples, while the STAs 104 may be capable of communicating with each other through the AP 102 using communication links 106, STAs 104 also can communicate directly with each other via direct wireless communication links 110. Additionally, two STAs 104 may communicate via a direct communication link 110 regardless of whether both STAs 104 are associated with and served by the same AP 102. In such an ad hoc system, one or more of the STAs 104 may function in the role filled by the AP 102 in a BSS. Such a STA 104 may be referred to as a group owner (GO) and may coordinate transmissions within the ad hoc network. Examples of direct wireless communication links 110 include Wi-Fi Direct connections, connections established by using a Wi-Fi Tunneled Direct Link Setup (TDLS) link, and other P2P group connections.

The APs 102 and STAs 104 may function and communicate (via the respective communication links 106) according to one or more of the IEEE 802.11 family of wireless communication protocol standards. These standards define the WLAN radio and baseband protocols for the PHY and MAC layers. The APs 102 and STAs 104 transmit and receive wireless communications (hereinafter also referred to as "Wi-Fi communications" or "wireless packets") to and from one another in the form of PHY protocol data units (PPDUs). The APs 102 and STAs 104 in the WLAN 100 may transmit PPDUs over an unlicensed spectrum, which may be a portion of spectrum that includes frequency bands traditionally used by Wi-Fi technology, such as the 2.4 GHz band, the 5 GHz band, the 60 GHz band, the 3.6 GHz band, and the 900 MHz band. Some examples of the APs 102 and STAs 104 described herein also may communicate in other frequency bands, such as the 5.9 GHz and the 6 GHz bands, which may support both licensed and unlicensed communications. The APs 102 and STAs 104 also can communicate over other frequency bands such as shared licensed frequency bands, where multiple operators may have a license to operate in the same or overlapping frequency band or bands.

Each of the frequency bands may include multiple sub-bands or frequency channels. For example, PPDUs conforming to the IEEE 802.11n, 802.11ac, 802.11ax and 802.11be standard amendments may be transmitted over the 2.4, 5 GHz or 6 GHz bands, each of which is divided into multiple 20 MHz channels. As such, these PPDUs are transmitted over a physical channel having a minimum bandwidth of 20 MHz, but larger channels can be formed through channel bonding. For example, PPDUs may be transmitted over physical channels having bandwidths of 40 MHz, 80 MHz, 160 or 320 MHz by bonding together multiple 20 MHz channels.

Each PPDU is a composite structure that includes a PHY preamble and a payload in the form of a PHY service data unit (PSDU). The information provided in the preamble may be used by a receiving device to decode the subsequent data in the PSDU. In instances in which PPDUs are transmitted over a bonded channel, the preamble fields may be duplicated and transmitted in each of the multiple component channels. The PHY preamble may include both a legacy portion (or "legacy preamble") and a non-legacy portion (or "non-legacy preamble"). The legacy preamble may be used for packet detection, automatic gain control and channel estimation, among other uses. The legacy preamble also may generally be used to maintain compatibility with legacy devices. The format of, coding of, and information provided in the non-legacy portion of the preamble is associated with the particular IEEE 802.11 protocol to be used to transmit the payload.

An AP 102 may operate in a 6 GHz band, which may provide for outdoor and high-power indoor operation. In such cases, standard power operation may use AFC functionality and geolocation capabilities at the AP 102. Geolocation may be essential to the operations of 6 GHz APs 102 and other fixed wireless communication devices or clients. For example, an AP 102 may provide its location (such as horizontal x-coordinates, y-coordinates, and/or vertical z-coordinates) to an AFC system, which may calculate available frequencies and power levels that the AP 102 may use. Z-axis (elevation) determination may utilize dedicated hardware, which may increase costs associated with the AP 102. For example, the AP 102 may use GPS or global navigation satellite system (GNSS) chips or barometric pressure sensors to determine its elevation. Moreover, this hardware may be professionally installed which may further increase costs. It should be noted that for standard power operation, unlicensed device's height in practice may be limited to the height of the buildings it is used in (for example, standard power devices may not be used in aircraft).

Various aspects generally relate to wireless communication and more particularly to estimating an elevation of an AP 102. In a WLAN, a wireless communication device such as a cloud service may leverage 3D building data to determine building heights and estimate the elevation of an AP 102. In some examples, the AP 102 may transmit geolocation information to the wireless communication device. Additionally, or alternatively, the AP 102 may transmit air pressure information, temperature information or both to the wireless communication device. Using the geolocation information, the wireless communication device may determine a set of one or more elevations associated with the access point and estimate a building height. For example, based on the geolocation information of the AP 102, which may include longitude and latitude coordinates, the wireless communication device may pre-process a set of building data that may include locations and heights of buildings within some defined geographical area of the AP 102. The wireless communication device may estimate a maximum building height of a building within the geographical area, and use the estimated building height to determine a possible elevation of the AP 102. Additionally, or alternatively, the wireless communication device may use the air pressure information, the temperature information, or both to determine the building height and estimate the set of one or more elevations. In some aspects, the wireless communication device may determine a set of transmission parameters the AP 102 may use based on the estimated building height, and the wireless communication device may transmit an indication of the set of transmission parameters to the AP 102.

Figure 2:
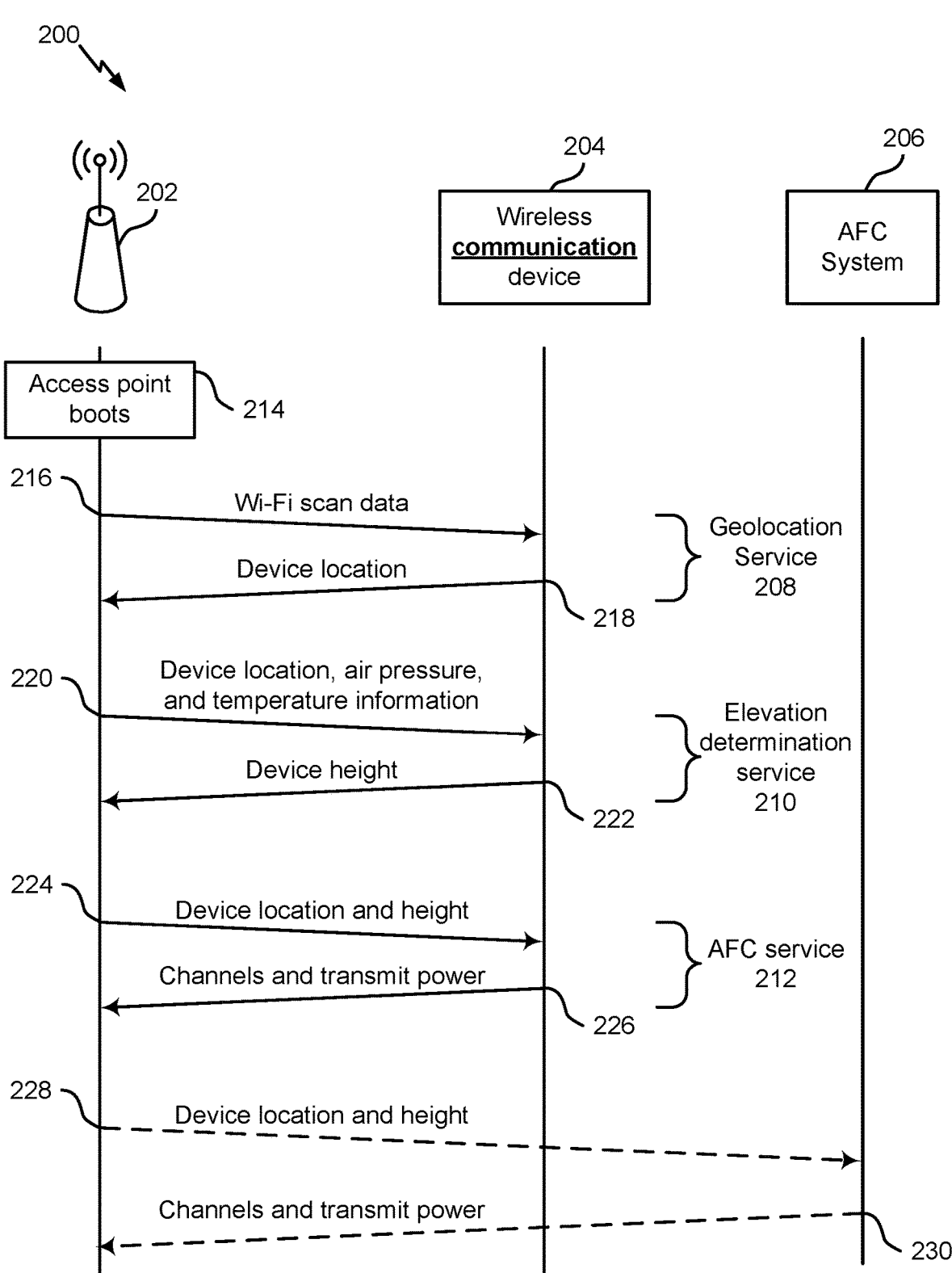
FIG. 2 shows a process flow illustrating an example process that supports elevation estimation for determining operating channels and transmission parameters.

FIG. 2 shows a process flow 200 illustrating an example process performable at a wireless communication device that supports elevation estimation for determining operating channels and transmission parameters according to some aspects of the present disclosure. In some examples, the process flow 200 may implement aspects of wireless communications system 100, or may be implemented by aspects of the wireless communications system 100. For example, the process flow 200 may illustrate operations between an AP 202, a wireless communication device 204 (such as a cloud service), and an AFC system 206, which may be examples of corresponding devices described herein. In the following description of the process flow 200, the operations between the AP 202, the wireless communication device 204, and/or the AFC system 206 may be transmitted in a different order than the example order shown, or the operations performed by the AP 202, the wireless communication device 204, and/or the AFC system 206 may be performed in different orders or at different times. Some operations may also be omitted from the process flow 200, and other operations may be added to the process flow 200. Additionally, aspects described as being performed at the AP 202, the wireless communication device 204, and/or the AFC system 206 may be combined or separated. For example, the wireless communication device 204 and the AFC system 206 may be part of a same device. In other examples, each of the AP 202, the wireless communication device 204, and/or the AFC system 206 may be part of separate devices.

A WLAN may support communications between the AP 202 and the wireless communication device 204 and/or the AFC system 206. The wireless communication device 204 may be a system or network entity, which may implement a cloud service (for example, one or more wireless communication devices may work in conjunction to function as a remote cloud service). At 214, the AP 202 may boot, in some examples, as a Wi-Fi router in a location, such as a home or an office. The AP 202 may indicate geolocation information to the wireless communication device 204. In some examples, the AP 202 may report its location as a longitude and latitude (in x-coordinates and/or y-coordinates) with at least a threshold level of confidence, such as a 95% confidence. Additionally, the AP 202 may indicate an area around the AP 202. For example, the AP 202 may indicate a radius around its location that may represent a coverage area of the AP 202 or an area in which the AP 202 may move to (for example in an office or apartment building).

At 216, the wireless communication device 204 may receive one or more messages from the AP 202 indicating the geolocation information of the AP 202. For example, the AP 202 may transmit Wi-Fi scan data to a Wi-Fi-based geolocation service 208. The wireless communication device 204 may utilize the one or more messages to determine the physical location of the AP 202. For example, if the geolocation information indicated in the one or more messages is stored in a database, the wireless communication device 204 (or the geolocation service 208 of the wireless communication device 204) may retrieve the geolocation information from the database. At 218, the wireless communication device 204 may transmit an indication of the geolocation information to the AP 202. In some examples, the Wi-Fi scan data may include air pressure information, temperature information, or both corresponding to the AP 202.

At 220, the AP 202 may transmit an indication of its location to an elevation determination service 210 of the wireless communication device 204. The elevation determination service 210 may be a building-based or a barometer-based elevation determination service. Using the AP's location and/or 3D building datasets, the wireless communication device 204 may determine heights of buildings around the AP 202 or that the AP 202 is located in and estimate elevation (for example, height) ranges and/or values of the AP 202. That is, the wireless communication device 204 may estimate a set of one or more elevations associated with the access point based on determining a building height corresponding to the geolocation information of the AP 202. For example, for a given geographical area around the AP 202 (such as the area indicated by the AP 202), the wireless communication device 204 may use the 3D building datasets to determine a building height, such as a maximum building height, where the 3D building datasets may store building locations and heights. In some aspects, the elevation determination service 210 may use the building height to estimate an elevation of the AP 202.

As described herein, the wireless communication device 204 may identify a set of buildings at least partially within the geographical area of the AP 202. Using the 3D building datasets, the wireless communication device 204 may identify a building heigh, such as a maximum building height, corresponding to one of the set of buildings and associate the maximum building height with a possible elevation range of the AP 202. For example, if the geographical area includes single or two-story buildings, the maximum building height may be approximately 10 m. As such, the AP 202 may have an elevation (a height off the ground) ranging from 0 m (ground level) to 10 m (on top of the building).

Additionally, or alternatively, the AP 202 may transmit air pressure information with its location. Because air pressure decreases as altitude increases above the surface of the earth, a relationship between height (elevation) and air pressure may be described by Equation 1.

$$h = CT_b \ln\left(\frac{p_0}{p}\right), \text{ where } C = \frac{R}{Mg} = \frac{29.2712m}{k} \quad (1)$$

In the example relationship between air pressure and altitude of Equation 1, h may represent a height (elevation)

above mean sea level (AMSL), $T_b$ may represent a temperature measured by the AP 202 in Kelvin, $P_0$ may represent a reference sea level pressure in pascals (pa) (in some cases, measured at a reference weather station), p may represent an air pressure in pa measured by the AP 202, and $$\frac{29.2712m}{k}$$

may represent a constant. A barometric pressure sensor associated with (for example, inside of) the AP 202 may measure and report the air pressure and the temperature. This air pressure and temperature information may be passed to the elevation determination service 210 along with the geolocation information (for example, an x-coordinate and a y-coordinate) of the AP 202.

In some examples, the wireless communication device 204, using the elevation determination service 210, may determine (for example, calculate or compute) a reference sea level pressure at the location of the AP 202. In some aspects, the wireless communication device 204 may use a database of sea level pressure information to determine the reference sea level pressure. To create such a database, the wireless communication device 204 may collect some quantity of data points over a given time period. In some cases, the wireless communication device 204 may collect the data points itself, or it may retrieve the data points from an existing database or service. For example, the wireless communication device 204 may collect 12,189 data points every hour for 717 public airport weather stations throughout the entire United States and its territories using a National Weather Service free-to-use API. The data points (for example, corresponding to each weather station) may include an adjusted sea level pressure, a temperature, a dew point, a wind direction, a wind speed, a wind gust, a barometric pressure, a visibility, maximum and minimum temperatures, precipitation levels (for example, per one hour, per three hours, per six hours), a humidity, an elevation, a wind chill, a heat index, or any combination thereof. The wireless communication device 204 may host these data, along with x-coordinates and y-coordinates of the location at which the data was measured (such as the location of a weather station), in a server. In some aspects, the wireless communication device 204 may transmit an API query, in some cases hourly, to update the database.

In some aspects, the wireless communication device 204 may use most recent data (such as data from a public weather station) to construct the database. Then, the wireless communication device 204 may use the database (which includes the barometer data) to determine the set of one or more elevations (an AMSL height) associated with the AP 202 for AFC purposes. When the wireless communication device 204 receives the location inquiry from the AP 202, including the air pressure information and in some cases, the temperature information, the wireless communication device 204 may use the sea level pressure information from the database (which may be aggregated from weather stations near the location of the AP 202) to interpolate or extrapolate a location-adjusted sea level pressure corresponding to the AP 202. That is, the wireless communication device 204 may determine reference air pressure information based on the geolocation information of the AP 202.

Additionally, or alternatively, the wireless communication device 204 may determine the reference air pressure information using a relationship that is based on the indicated temperature information, the indicated geolocation information, and an elevation of the AP 202 (for example, Equation 1). In some aspects, the wireless communication device 204 may use the reference sea level pressure (a sea level pressure adjusted based on the location of the AP 202) and the temperature information to calculate the set of elevations of the AP 202 AMSL.

In some examples, the wireless communication device 204 may use a calibration algorithm to improve accuracy of the elevation (height) determination. The wireless communication device 204 may deploy the calibration algorithm at the AP 202 to track short and long-term variations in the barometer data. Additionally, or alternatively, the wireless communication device 204 may apply the calibration algorithm to locally-maintained reference sea level air pressure information to continuously improve accuracy of such data. For example, after a barometer sensor or other device is assembled, its air pressure and temperature readings may be compared to an ideal reference pressure and temperature sensor on the production floor at the same elevation. The offsets may be stored in non-volatile memory associated with the device, and the offsets may be applied to a barometer output before the AP 202 transmits the location inquiry to the wireless communication device 204. In some examples, this correction may improve a 95% confidence interval of the air pressure from 30 pa to 2 pa.

At 222, the wireless communication device 204 may transmit an indication of a set of elevations associated with the AP 202 based on determining the elevations using the maximum building height, in which the indication may include an uncertainty associated with a respective elevation of the set of elevations. That is, for the set of elevations from 0 m to 10 m, the wireless communication device 204 may indicate an elevation of 5 m with an uncertainty of 5 m (such that the indication includes 5 m+/−5 m). Determining the maximum building height and estimating an elevation range of the AP 202 in this way is described herein with reference to FIG. 3.

If the AP 202 is located in an area with no buildings, the wireless communication device 204 may use a default height a maximum building height with which to estimate a highest elevation of the AP 202. For example, if the AP 202 with omni-directional antennas is installed approximately 4 m above the ground, in some aspects such as on a light pole, the wireless communication device 204 may use as a default (e.g., assume) a maximum elevation of the AP 202 is 8 m (corresponding to a nominal elevation plus an uncertainty of 4 m+/−4 m).

In addition to providing z-axis data for the AP 202 and other standard power devices, the elevation determination service 210 may improve channel availability of an AFC system by limiting an elevation range of the AP 202 to a building height, such as a maximum building height (such that the range includes [0, maxBuildingHeight]), in examples in which an elevation range provided by the AP 202 exceeds the maximum building height (is outside of the elevation range estimated by the wireless communication device 204). For example, the AP 202 may transmit an indication of its location (in latitude and longitude coordinates) and its elevation to the wireless communication device 204, in which the AP 202 may determine its elevation using GPS or a barometric pressure sensor. In addition, the AP 202 may indicate a volume surrounding it, which the AP 202 may define based on the geographical area and the elevation. The wireless communication device 204 may evaluate the volume associated with the AP 202 to check whether other wireless communication devices may interfere with the AP 202 at particular operating frequencies. Because the AP 202 determined its elevation using GPS or the barometric pressure sensor, the AP 202 may report a large uncertainty such as 5 m+/−20 m, suggesting that the AP 202 may have an elevation between 0 m to 25 m. However, if the wireless communication device 204 previously determined a maximum building height of 10 m, and thus an elevation range of 0 m to 10 m (5 m+/−5 m), the wireless communication device 204 may restrict the maximum elevation of the AP 202 to 10 m instead of 25 m and use this elevation for future calculations to yield more accurate results.

At 224, the AP 202 may transmit an indication of its location and height (which may be the elevation range and/or value determined and indicated by the elevation determination service 210) to an AFC service 212. Using the AFC service 212, the wireless communication device 204 may determine a set of one or more transmission parameters for the AP 202 based on the estimated maximum building height and the corresponding elevation range of the AP 202. The set of transmission parameters may include one or more transmit powers, one or more channels for the AP 202 associated with the transmit power, or one or more frequencies for the AP 202 associated with the transmit power, or any combination thereof. For example, the AP 202 may have access to different frequencies at different elevations, or the AP 202 may use lower transmit powers if it is located above surrounding buildings (and therefore may create relatively less interference). At 226, the wireless communication device 204 may transmit an indication of the set of transmission parameters to the AP 202.

In some aspects, the wireless communication device 204 may combine the functionalities of the Wi-Fi-based geolocation service 208 and the elevation determination service 210. For example, the AP 202 may transmit the Wi-Fi scan data to both of these components of the wireless communication device 204, and the combined Wi-Fi-based geolocation service 208 and elevation determination service 210 may estimate the maximum building height and elevation range of the AP 202 and transmit an indication of the AP's location and elevation. This may occur if the wireless communication device 204 already knows the location of the AP 202, for example based on retrieving geolocation information, air pressure information, or temperature information of the AP 202 from the database. The AP 202 may then provide an indication of its location and elevation to the AFC service 212, which may determine the set of transmission parameters (for example, a transmit power, one or more channels, one or more frequencies, or a combination thereof) of the AP 202 as described herein.

Alternatively, the wireless communication device 204 may combine the functionalities of the Wi-Fi-based geolocation service 208, the elevation determination service 210, and the AFC service 212. In this way, the combined components may receive the Wi-Fi scan data from the AP 202, estimate the maximum building height and elevation range of the AP 202, determine the set of transmission parameters of the AP 202 based on the elevation range, and transmit an indication of the set of transmission parameters to the AP 202. In such cases, a "location" object may replace the Wi-Fi scan data such that the wireless communication device 204 may combine geolocation information and AFC inquiries into a single request. In this way, the AP 202 may lack information about its own location and still receive the indication of the set of transmission parameters from the wireless communication device 204.

In some examples, the AP 202 may communicate with an AFC system 206 (such as a third-party AFC system) instead of the AFC service 212 of the wireless communication device 204. At 228, after providing geolocation information to the Wi-Fi-based geolocation service 208 and the elevation determination service 210, which may estimate the elevation range of the AP 202, the AP 202 may transmit an indication of its location and height to the AFC system 206. At 230, the AFC system 206 may then determine and transmit an indication of the set of transmission parameters for the AP 202.

Figure 3:
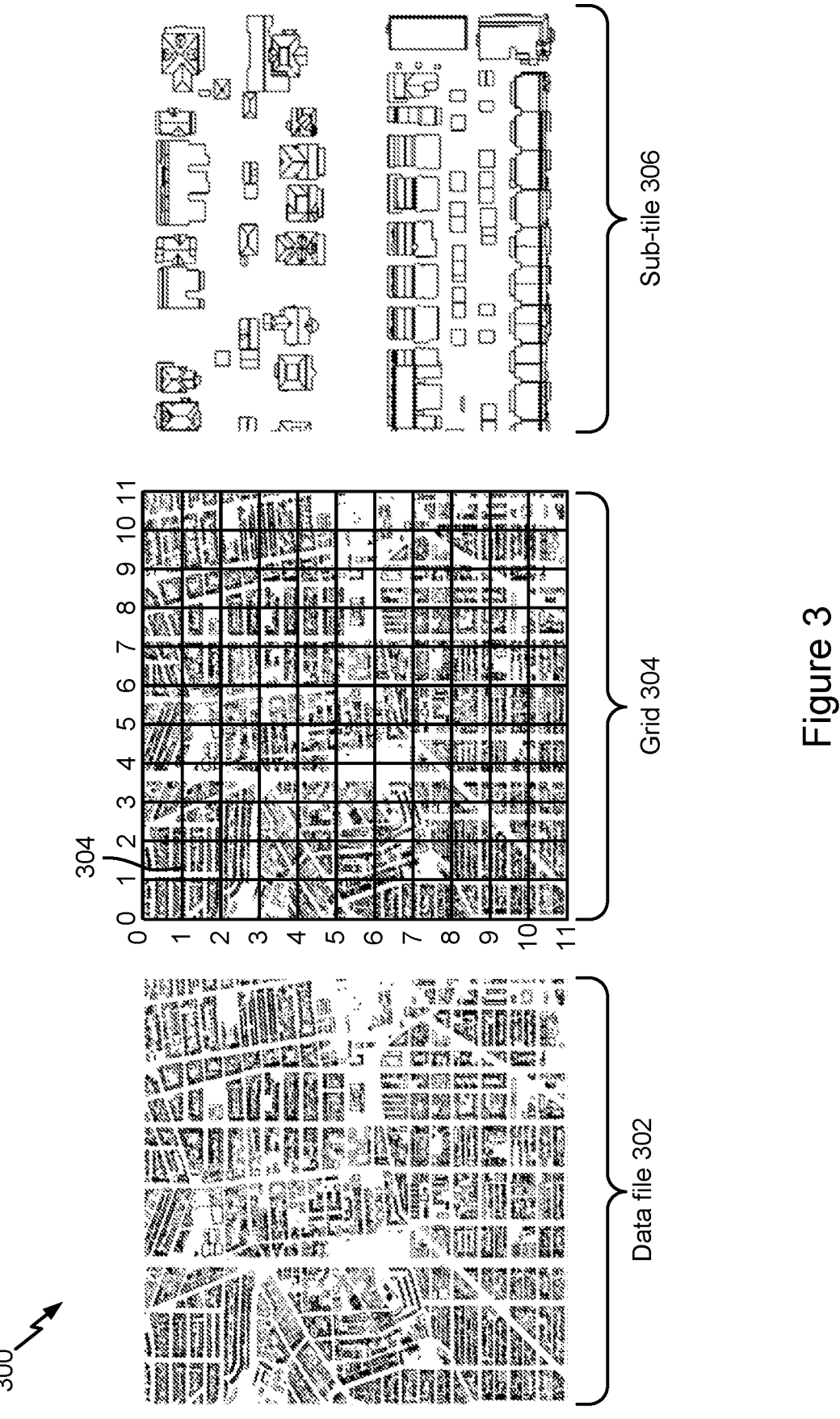
FIG. 3 shows a pictorial diagram of example building data that supports elevation estimation for determining operating channels and transmission parameters.

FIG. 3 shows a diagram illustrating example building data 300 that supports elevation estimation for determining operating channels and transmission parameters according to some aspects of the present disclosure. In some examples, the building data 300 may implement aspects of the wireless communications system or may be implemented by aspects of the wireless communications system 100. For example, a wireless communication device such a cloud service may use the building data 300 to determine a maximum building height in a given geographical area surrounding an AP. Using the maximum building height, the wireless communication device may estimate an elevation (height) range of the AP. In some examples, the building data 300 may include 3D building information corresponding to a set of buildings located in the geographical area, which may include locations and heights of each building.

As described herein, an AP may indicate its geolocation information to a wireless communication device, which may include latitude and longitude coordinates of the AP (or some other indication of the AP's physical location). The wireless communication device may use the location of the AP and a 3D building dataset to determine a maximum building height. Real-time processing of a full building dataset, however, may increase latency of a cloud service because such processing may use large amounts of data storage. Moreover, each time the cloud service receives an inquiry for an AP elevation, the cloud service may find all buildings within a search area and determine their heights from the 3D building dataset, which may be time and resource intensive.

Using the described techniques, the wireless communication device may pre-process the full building dataset and generate the building data 300, a dataset that stores a maximum building height in 1 arc-second-by-1 arc-second areas across a region or country in which the wireless communication device and an AFC system is operating. That is, the wireless communication device may pre-process a set of building data to determine a set of one or more elevations associated with the AP, the set of building data including a set of building locations and a set of building heights corresponding to a set of buildings within a geographical area of the AP. The wireless communication device may increase or decrease the resolution of the area in which the building data 300 stores the maximum building height based on system requirements.

To accurately determine a maximum building height in each area, the wireless communication device may pre-process and store the building data 300 and retrieve information based on receiving a query from the AP. The wireless communication device may create a two-dimensional (2D) array of a data file 302, which may represent a 1 arc-hour-by-1 arc-hour area measured between latitude and longitude points. The wireless communication device may then further divide the data file 302 (a tile) into sub-tiles 306 each representing a 1 arc-second-by-1 arc-second area, such that the data file 302 represents a total area of 3600-by-3600 arc seconds. A 1 arc-second-by-1 arc-second sub-tile may correspond to approximately a 30 m-by-30 m area.

As described with reference to FIG. 3, the wireless communication device may obtain the data file 302 from a source and store the data file 302 in a disk for processing. The data file 302 may include building height and building geographical geometry information for a set of buildings. For example, the shapes in the data file 302 may represent buildings stored as a set of polygons, and may include different information such as a building height and a building location, among other possible building information. Moreover, the data file 302 may represent a city, a country, or some other relatively large geographical region.

In some aspects, the wireless communication device may overlay the data file 302 on the 2D data structure, described by Table 1 shown below, by matching latitude and longitude coordinates of the area represented in the data file 302 with a grid 304. That is, the wireless communication device may overlay the grid 304 with a numbering system over the data file 302 to divide the data file 302 into sub-tiles. In doing so the wireless communication device may associate the data file 302 (which is of the set of building data) to latitude and longitude coordinates corresponding to the geographical area of the AP to determine a maximum building height within that area. Each sub-tile in the grid 304 may represent a 1 arc-second-by-1 arc-second area. It should be noted that the wireless communication device may increase or decrease the sizes of each sub-tile and the grid 304 based on system requirements. In this way, the wireless communication device may match an arc-second division of the data structure to the data file 302 such that the wireless communication device may retrieve information one tile at a time.

After parsing all of the data in the data file 302 and applying the grid 304 to create the tiles, the wireless communication device may encode the northwest coordinate into the name of the corresponding file, which may allow for dynamic retrieval of files. For example, if the latitude-longitude coordinates of a sub-tile of the grid 304 are (38.678, −77.876), the file name may be "name_N39_W78.file". Based on the geolocation information of the AP, the wireless communication device may select a sub-tile of the grid 304 for which to determine a maximum building height. For example, the wireless communication device may select the sub-tile 306 as it may represent a geographical area around the AP. The wireless communication device may focus on the sub-tile 306, analyze each building in the sub-tile 306, and determine the maximum height of a building in the sub-tile 306. In this way, the wireless communication device may parse the data file 302 in transects of arc seconds squared and determine a maximum height of all of the buildings in the corresponding geographical area. The wireless communication device may load the matching cell in Table 1 with the maximum building height such that the wireless communication device assigns that height to the entire area of the sub-tile 306. In this way, the wireless communication device may store the maximum building height for future queries, and the maximum building height data may be quantized to reduce storage requirements (for example, rounded up to every 4 meters or 10 meters). In some aspects, the wireless communication device may store the data and repeat the maximum building height determination for each sub-tile in the area of interest (shown in the data file 302), such as all United States (U.S.) territories for U.S. AFC consumption.

The wireless communication device may determine a maximum building height for each 1 arc-second-by-1 arc-second sub-tile (30 m-by-30 m area) included in the data file

302. Table 1, shown below, illustrates example maximum building heights for the data file 302 (3600-by-3600 arc seconds), in which each maximum building height corresponds to an arc-second in longitude (y-coordinate), $y_{arcs}$, and an arc-second in latitude (x-coordinate), $x_{arcs}$.

TABLE 1

| Maximum building heights per sub-tile | | | | |
|---|---|---|---|---|
| | $x_{arcs}$ | | | |
| $y_{arcs}$ | 0 | 1 | 2 | ... | 3599 |
| 0 | 4 | 0 | 16 | 20 | 8 |
| 1 | 24 | 28 | 8 | 4 | 0 |
| 2 | 4 | 36 | 20 | 8 | 4 |
| ... | 0 | 0 | 4 | 16 | 8 |
| 3599 | 28 | 32 | 32 | 4 | 8 |

In the example of maximum building height data described by Table 1, each cell may correspond to a sub-tile of the grid 304, such as the sub-tile 306 corresponding to $y_{arcs}$, $x_{arcs}$ coordinates (1, 2). To determine the maximum building height in the sub-tile 306, the wireless communication device may query the coordinates (1, 2) on Table 1 and retrieve 8 m as the maximum building height. Accordingly, the wireless communication device may estimate an elevation range of the AP located in the area of the sub-tile 306 as 0 m to 8 m (4 m+/−4 m).

The wireless communication device may retrieve information for the sub-tile 306 based on the geolocation information of the AP. For example, given a latitude and longitude coordinate, the wireless communication device may read the information of a corresponding sub-tile, such as the sub-tile 306. In some aspects, the wireless communication device may cache the data to increase processing time. For example, the wireless communication device may load the sub-tiles of the grid 304 into a least recently used (LRU) cache for faster retrieval of data.

In some aspects, the AP may transmit an application programming interface (API) request for its elevation range as determined by the wireless communication device. The wireless communication device may return either a maximum height, or a nominal height with an uncertainty range, to the AP. For example, the wireless communication device may return an indication of an elevation of the AP in the sub-tile 306 as 8 m or as 4 m+/−4 m. In some other examples, the wireless communication device may return an indication of an elevation of the AP as 66 m or as 33 m+/−33 m.

The request for elevation information transmitted by the AP may include different formats. For example, the AP may include its geolocation information in the request in the form of an ellipse, a radial polygon, a linear polygon, or a combination thereof. In the case of an ellipse, the AP may indicate latitude and longitude coordinates of the ellipse's center (37.4298695, −122.1693068), major axis and minor axis lengths (20 m, 20 m), and an orientation (0 degrees). If the AP indicates its geolocation information as a radial polygon, the AP may indicate latitude and longitude coordinates of the polygon's center (30.571694, −102.230361), and lengths and angles of the outer boundaries of the polygon (50 m, 0 degrees; 50 m, 90 degrees; 50 m, 180 degrees; 50 m, 270 degrees). To indicate the area around the AP as a linear polygon, the AP may indicate latitude and longitude coordinates of the polygon's outer boundaries ([30.570949418926617, −102.23787512897941], [30.570949418926617, −102.23187512897941],

[30.576949418926617, −102.23187512897941], [30.576949418926617, −102.23787512897941].

The wireless communication device may use the indicated geolocation information to select a sub-tile of the grid 304 and retrieve a corresponding maximum building height. For example, in response to the request from the AP, the wireless communication device may transmit an indication of a maximum building height for the sub-tile 306 as a value (8), an accuracy (8) a height type (above ground level (AGL)), and a unit (meters).

Figure 4:
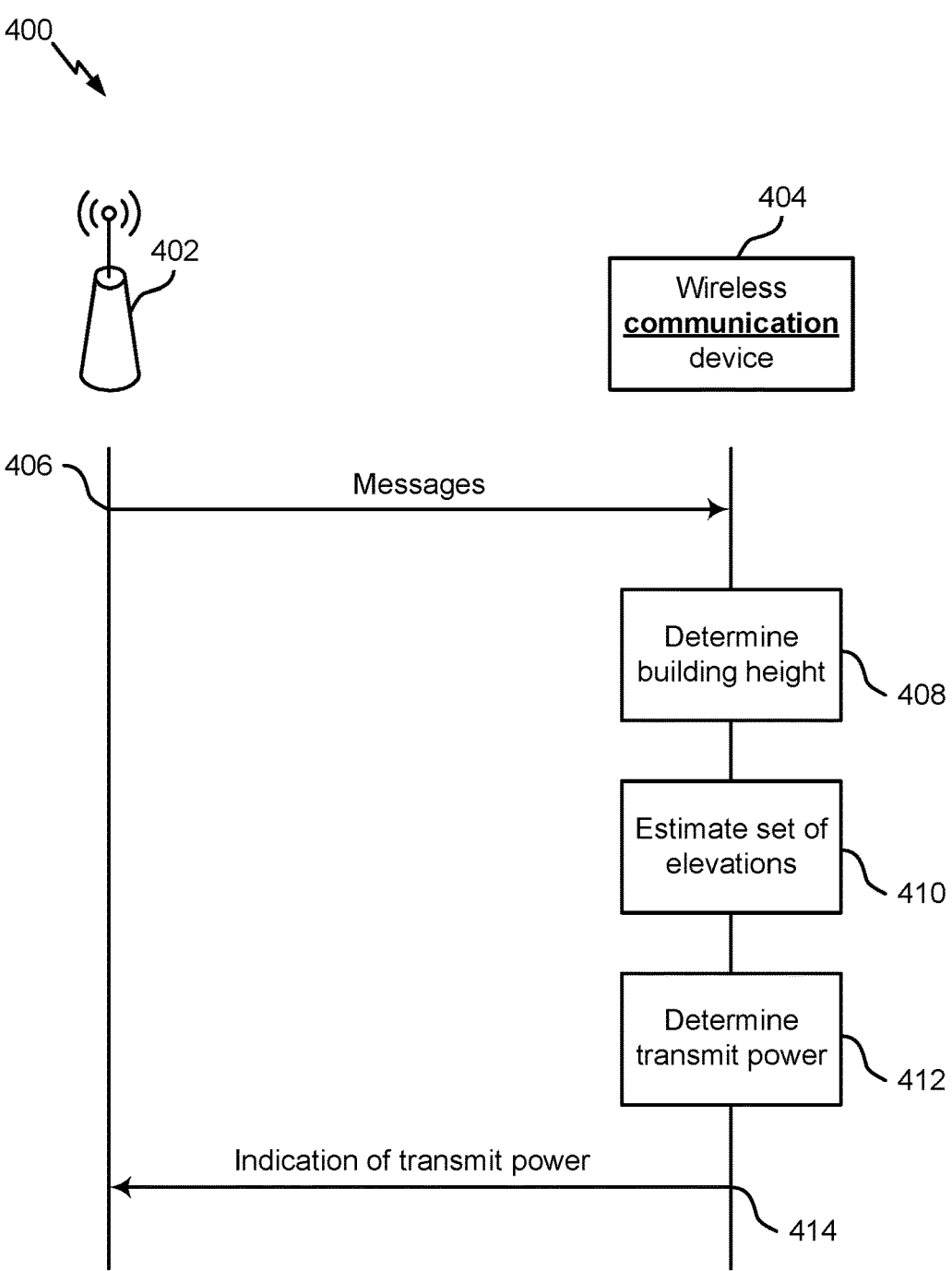
FIG. 4 shows a process flow illustrating an example process that supports elevation estimation for determining operating channels and transmission parameters.

FIG. 4 shows a process flow 400 illustrating an example process performable at a wireless communication device that supports elevation estimation for determining operating channels and transmission parameters according to some aspects of the present disclosure. In some examples, the process flow 400 may implement aspects of wireless communications system 100, or may be implemented by aspects of the wireless communications system 100. For example, the process flow 400 may illustrate operations between an AP 402, and a wireless communication device 404 (a cloud service), which may be examples of corresponding devices described herein. In the following description of the process flow 400, the operations between the AP 402 and the wireless communication device 404 may be transmitted in a different order than the example order shown, or the operations performed by the AP 402 and the wireless communication device 404 may be performed in different orders or at different times. Some operations may also be omitted from the process flow 400, and other operations may be added to the process flow 400.

At 406, the wireless communication device 404 may receive, from the AP 402, one or more messages indicating geolocation information of the AP 402. The geolocation information may include latitude and longitude coordinates corresponding to the AP's physical location in a given geographical area. In some aspects, the one or more messages may additionally indicate the geographical area around the AP 402. Additionally, or alternatively, the one or more messages may include air pressure information, temperature information, or both measured at the location of the AP 402.

At 408, the wireless communication device 404 may determine a building height corresponding to the indicated geolocation information. For example, the wireless communication device 404 may use the geolocation information and a 3D building dataset to identify one or more buildings within the geographic area of the AP 402 (for example, near or surrounding the AP 402), or a building in which the AP 402 is located. The wireless communication device 404 may then determine a maximum building height of the highest building surrounding the AP 402 or of the building the AP 402 is located in.

At 410, the wireless communication device 404 may estimate a set of one or more elevations associated with the AP 402 based on determining the building height. For example, if the maximum building height is 10 m AGL, the wireless communication device 404 may estimate that the set of elevations is 0 m to 10 m (5+/−5 m AGL). Alternatively, the wireless communication device 404 may estimate the set of one or more elevations based on the indicated air pressure information and in some cases, the indicated temperature information.

At 412, the wireless communication device 404 may determine a set of one or more transmission parameters for the AP 402 based on the estimated set of elevations. The set of transmission parameters may include one or more transmit powers, one or more channels for the AP 402 associated with the transmit power, or one or more frequencies for the AP 402 associated with the transmit power, or any combination thereof. For example, the transmit power may differ if the AP 402 is higher than other buildings in the geographical area. Additionally, or alternatively, the wireless communication device 404 may determine available or preferred frequencies, channels, or other operating parameters for the AP 402.

At 414, the wireless communication device 404 may transmit an indication of the set of transmission parameters to the AP 402. In this way, the AP 402 may use this set of transmission parameters until it is shut off and rebooted (in some aspects, being moved to a new location before the reboot), or until a time indicated by the wireless communication device 404 at which provided channels and power may expire.

FIG. 5 shows a flowchart illustrating an example process 500 performable at a wireless communication device that supports elevation estimation for determining operating channels and transmission parameters according to some aspects of the present disclosure. The operations of the process 500 may be implemented by a wireless communication device or its components as described herein. For example, the process 500 may be performed by a wireless communication device, such as the wireless communication device 1100 described with reference to FIG. 11, operating as or within a wireless communication device. In some examples, the process 500 may be performed by a wireless communication device such as one of the wireless communication devices described with reference to FIG. 1.

In some examples, in block 502, the wireless communication device may receive one or more messages indicating geolocation information of an AP. The operations of block 502 may be performed in accordance with examples as disclosed herein. In some examples, aspects of the operations of block 502 may be performed by a message component 1102 as described with reference to FIG. 11.

In some examples, in block 504, the wireless communication device may estimate a set of one or more elevations associated with the AP based on determining a building height corresponding to the indicated geolocation information. The operations of block 504 may be performed in accordance with examples as disclosed herein. In some examples, aspects of the operations of block 504 may be performed by an elevation component 1104 as described with reference to FIG. 11.

In some examples, in block 506, the wireless communication device may transmit an indication of a set of one or more transmission parameters for the AP that are associated with one or more of the set of elevations. The operations of block 506 may be performed in accordance with examples as disclosed herein. In some examples, aspects of the operations of block 506 may be performed by a parameter component 1106 as described with reference to FIG. 11.

Figure 6:
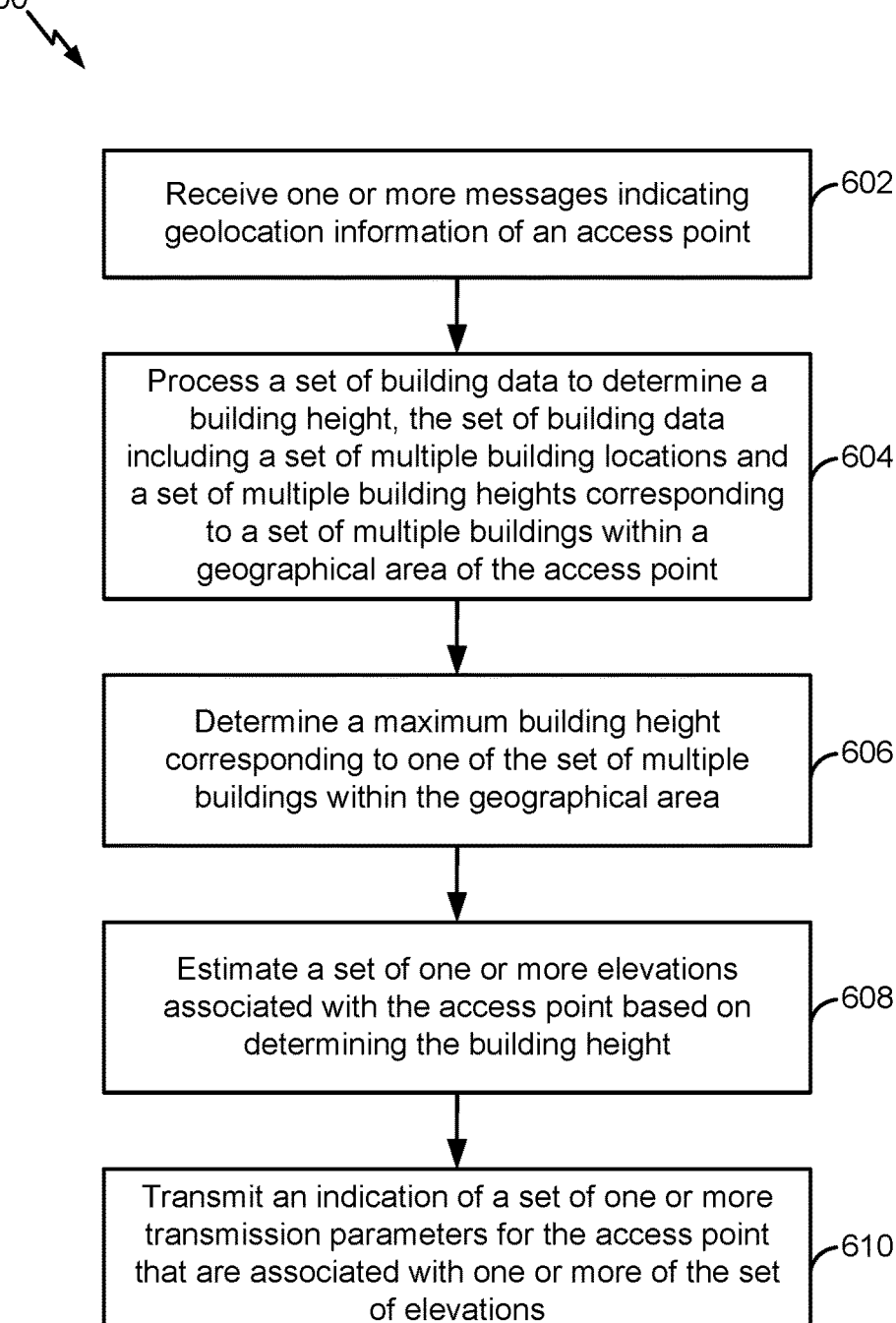

FIG. 6 shows a flowchart illustrating an example process 600 performable at a wireless communication device that supports elevation estimation for determining operating channels and transmission parameters according to some aspects of the present disclosure. The operations of the process 600 may be implemented by a wireless communication device or its components as described herein. For example, the process 600 may be performed by a wireless communication device, such as the wireless communication device 1100 described with reference to FIG. 11, operating as or within a wireless communication device. In some examples, the process 600 may be performed by a wireless communication device such as one of the wireless communication devices described with reference to FIG. 1.

In some examples, in block 602, the wireless communication device may receive one or more messages indicating geolocation information of an AP. The operations of block 602 may be performed in accordance with examples as disclosed herein. In some examples, aspects of the operations of block 602 may be performed by a message component 1102 as described with reference to FIG. 11.

In some examples, in block 604, the wireless communication device may process a set of building data to determine a building height, the set of building data including a set of multiple building locations and a set of multiple building heights corresponding to a set of multiple buildings within a geographical area of the AP. The operations of block 604 may be performed in accordance with examples as disclosed herein. In some examples, aspects of the operations of block 604 may be performed by a processing component 1110 as described with reference to FIG. 11.

In some examples, in block 606, the wireless communication device may determine a maximum building height corresponding to one of the set of multiple buildings within the geographical area. The operations of block 606 may be performed in accordance with examples as disclosed herein. In some examples, aspects of the operations of block 606 may be performed by a building height component 1112 as described with reference to FIG. 11.

In some examples, in block 608, the wireless communication device may estimate a set of one or more elevations associated with the AP based on determining the building. The operations of block 608 may be performed in accordance with examples as disclosed herein. In some examples, aspects of the operations of block 608 may be performed by an elevation component 1104 as described with reference to FIG. 11.

In some examples, in block 610, the wireless communication device may transmit an indication of a set of one or more transmission parameters for the AP that are associated with one or more of the set of elevations. The operations of block 610 may be performed in accordance with examples as disclosed herein. In some examples, aspects of the operations of block 610 may be performed by a parameter component 1106 as described with reference to FIG. 11.

FIG. 7 shows a flowchart illustrating an example process 700 performable at a wireless AP that supports elevation estimation for determining operating channels and transmission parameters according to some aspects of the present disclosure. The operations of the process 700 may be implemented by a wireless AP or its components as described herein. For example, the process 700 may be performed by a wireless communication device, such as the wireless communication device 1200 described with reference to FIG. 12, operating as or within a wireless AP. In some examples, the process 700 may be performed by a wireless AP such as one of the APs 102 described with reference to FIG. 1.

In some examples, in block 702, the wireless AP may transmit one or more messages indicating geolocation information of the AP and indicating a set of one or more elevations associated with the AP based on the geolocation information. The operations of block 702 may be performed in accordance with examples as disclosed herein. In some examples, aspects of the operations of block 702 may be performed by a geolocation information component 1202 as described with reference to FIG. 12.

In some examples, in block 704, the wireless AP may receive an indication of a set of one or more transmission parameters for the AP from a wireless communication device based on the indicated geolocation information and the set of elevations, the set of elevations based on a determined building height. The operations of block 704 may be performed in accordance with examples as disclosed herein. In some examples, aspects of the operations of block 704 may be performed by a transmission parameter component 1204 as described with reference to FIG. 12.

FIG. 8 shows a flowchart illustrating an example process 800 performable at a wireless AP that supports elevation estimation for determining operating channels and transmission parameters according to some aspects of the present disclosure. The operations of the process 800 may be implemented by a wireless AP or its components as described herein. For example, the process 800 may be performed by a wireless communication device, such as the wireless communication device 1200 described with reference to FIG. 12, operating as or within a wireless AP. In some examples, the process 800 may be performed by a wireless AP such as one of the APs 102 described with reference to FIG. 1.

In some examples, in block 802, the wireless AP may transmit one or more messages indicating geolocation information of the AP and indicating a set of one or more elevations associated with the AP based on the geolocation information. The operations of block 802 may be performed in accordance with examples as disclosed herein. In some examples, aspects of the operations of block 802 may be performed by a geolocation information component 1202 as described with reference to FIG. 12.

In some examples, in block 804, the wireless AP may receive an indication of the set of elevations associated with the AP from the wireless communication device, the indication of the set of elevations including an uncertainty associated with a respective elevation of the set of elevations. The operations of block 804 may be performed in accordance with examples as disclosed herein. In some examples, aspects of the operations of block 804 may be performed by a signaling component 1206 as described with reference to FIG. 12.

In some examples, in block 806, the wireless AP may receive an indication of a set of one or more transmission parameters for the AP from a wireless communication device based on the indicated geolocation information and the set of elevations, the set of elevations based on a determined building height. The operations of block 806 may be performed in accordance with examples as disclosed herein. In some examples, aspects of the operations of block 806 may be performed by a transmission parameter component 1204 as described with reference to FIG. 12.

FIG. 9 shows a flowchart illustrating an example process 900 performable at a wireless communication device that supports elevation estimation for determining operating channels and transmission parameters according to some aspects of the present disclosure. The operations of the process 900 may be implemented by a wireless communication device (a cloud service) or its components as described herein. For example, the process 900 may be performed by a wireless communication device, such as the wireless communication device 1200 described with reference to FIG. 10. In some examples, the process 900 may be performed by a wireless communication device such as those described with reference to FIG. 1.

In some examples, in block 902, the wireless communication device may receive one or more messages indicating air pressure information and geolocation information of the AP. The operations of block 902 may be performed in accordance with examples as disclosed herein. In some examples, aspects of the operations of block 902 may be performed by a message component 1102 as described with reference to FIG. 11.

In some examples, in block 904, the wireless communication device may estimate a set of one or more elevations associated with the AP based on determining a height corresponding to the indicated air pressure information. The operations of block 904 may be performed in accordance with examples as disclosed herein. In some examples, aspects of the operations of block 904 may be performed by an elevation component 1104 as described with reference to FIG. 11.

In some examples, in block 906, the wireless communication device may transmit an indication of a set of one or more transmission parameters for the AP, the set of transmission parameters based determined based on the estimated set of elevations. The operations of block 906 may be performed in accordance with examples as disclosed herein. In some examples, aspects of the operations of block 906 may be performed by a parameter component 1106 as described with reference to FIG. 11.

FIG. 10 shows a flowchart illustrating an example process 1000 performable at a wireless communication device that supports elevation estimation for determining operating channels and transmission parameters according to some aspects of the present disclosure. The operations of the process 1000 may be implemented by a wireless communication device (a cloud service) or its components as described herein. For example, the process 1000 may be performed by a wireless communication device, such as the wireless communication device 1200 described with reference to FIG. 10. In some examples, the process 1000 may be performed by a wireless communication device such as those described with reference to FIG. 1.

In some examples, in block 1002, the wireless communication device may receive one or more messages indicating air pressure information and geolocation information of the AP. The operations of block 1002 may be performed in accordance with examples as disclosed herein. In some examples, aspects of the operations of block 1002 may be performed by a message component 1102 as described with reference to FIG. 11.

In some examples, in block 1004, the wireless communication device may determine reference air pressure information based on the geolocation information of the AP. The operations of block 1004 may be performed in accordance with examples as disclosed herein. In some examples, aspects of the operations of block 1004 may be performed by an elevation component 1104 as described with reference to FIG. 11.

In some examples, in block 1006, the wireless communication device may determine a height based on the indicated air pressure information, temperature information, and the determined reference air pressure information. The operations of block 1006 may be performed in accordance with examples as disclosed herein. In some examples, aspects of the operations of block 1006 may be performed by an elevation component 1104 as described with reference to FIG. 11.

In some examples, in block 1008, the wireless communication device may estimate a set of one or more elevations associated with the AP based on determining the height. The operations of block 1008 may be performed in accordance with examples as disclosed herein. In some examples, aspects of the operations of block 1008 may be performed by an elevation component 1104 as described with reference to FIG. 11.

In some examples, in block 1010, the wireless communication device may transmit an indication of a set of one or more transmission parameters for the AP that are associated with one or more of the set of elevations. The operations of block 1010 may be performed in accordance with examples as disclosed herein. In some examples, aspects of the operations of block 1010 may be performed by a parameter component 1106 as described with reference to FIG. 11.

Figure 11:
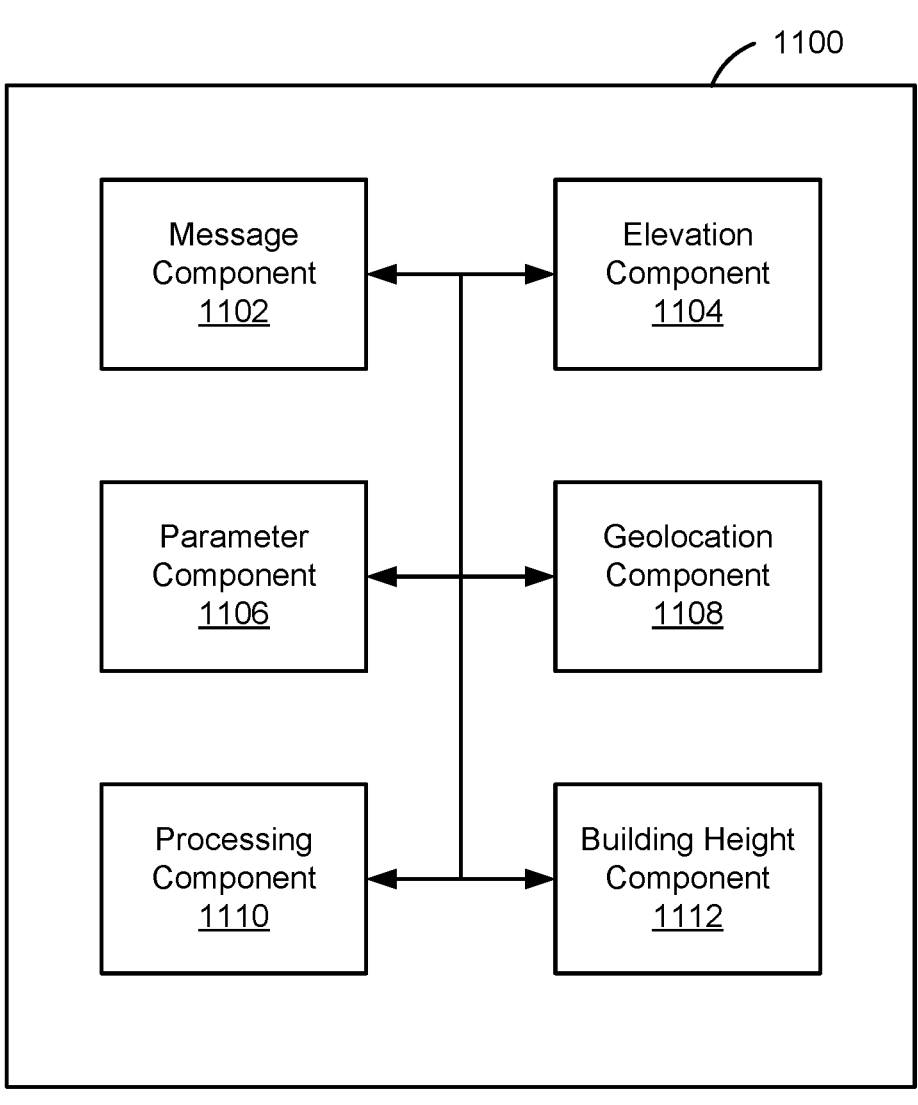
FIG. 11 shows a block diagram of an example wireless communication device that supports elevation estimation for determining operating channels and transmission parameters.

FIG. 11 shows a block diagram of an example wireless communication device 1100 that supports elevation estimation for determining operating channels and transmission parameters according to some aspects of the present disclosure. In some examples, the wireless communication device 1100 is configured or operable to perform the process 500 described with reference to FIG. 5. In various examples, the wireless communication device 1100 can be a chip, SoC, chipset, package or device that may include: one or more modems (such as a Wi-Fi (IEEE 802.11) modem or a cellular modem such as 3GPP 4G LTE or 5G compliant modem); one or more processors, processing blocks or processing elements (collectively "the processor"); one or more radios (collectively "the radio"); and one or more memories or memory blocks (collectively "the memory").

In some examples, the wireless communication device 1100 can be a device for use in an wireless communication device, such as cloud service described with reference to FIG. 1. In some other examples, the wireless communication device 1100 can be an AP that includes such a chip, SoC, chipset, package or device as well as multiple antennas. The wireless communication device 1100 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 802.11 family of wireless communication protocol standards. In some examples, the wireless communication device 1100 also includes or can be coupled with an application processor which may be further coupled with another memory. In some examples, the wireless communication device 1100 further includes at least one external network interface that enables communication with a core network or backhaul network to gain access to external networks including the Internet.

The wireless communication device 1100 includes a message component 1102, an elevation component 1104, a parameter component 1106, a geolocation component 1108, a processing component 1110, and a building height component 1112. Portions of one or more of the components 1102, 1104, 1106, 1108, 1110 and 1112 may be implemented at least in part in hardware or firmware. For example, the elevation component 1104 may be implemented at least in part by a modem. In some examples, at least some of the components 1102, 1104, 1106, 1108, 1110 and 1112 are implemented at least in part by a processor and as software stored in a memory. For example, portions of one or more of the components 1102, 1104, 1106, 1108, 1110 or 1112 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the device 1100). For example, a processing system of the device 1100 may refer to a system including the various other components or subcomponents of the device 1100, such as the processor, or a transceiver, or a communications manager, or other components or combinations of components of the device 1100. The processing system of the device 1100 may interface with other components of the device 1100, and may process information received from other components (such as inputs or signals) or output information to other components. For example, a chip or modem of the device 1100 may include a processing system, a first interface to output information and a second interface to obtain information. In some implementations, the first interface may refer to an interface between the processing system of the chip or modem and a transmitter, such that the device 1100 may transmit information output from the chip or modem. In some implementations, the second interface may refer to an interface between the processing system of the chip or modem and a receiver, such that the device 1100 may obtain information or signal inputs, and the information may be passed to the processing system. A person having ordinary skill in the art will readily recognize that the first interface also may obtain information or signal inputs, and the second interface also may output information or signal outputs.

The message component 1102 is capable of, configured to, or operable to receive one or more messages indicating geolocation information of an AP. The elevation component 1104 is capable of, configured to, or operable to estimate a set of one or more elevations associated with the AP based on determining a building height corresponding to the indicated geolocation information. The parameter component 1106 is capable of, configured to, or operable to transmit an indication of a set of one or more transmission parameters for the AP that are associated with one or more of the set of elevations.

In some examples, the geolocation component 1108 is capable of, configured to, or operable to transmit an indication of the geolocation information to the AP in response to receiving the one or more messages based on retrieving the geolocation information from a database.

In some examples, the set of one or more transmission parameters includes one or more transmit powers, one or more channels for the AP associated with the transmit power, or one or more frequencies for the AP associated with the transmit power, or any combination thereof.

In some examples, the elevation component 1104 is capable of, configured to, or operable to transmit an indication of the set of elevations associated with the AP based on estimating the set of elevations, the indication of the set of elevations including an uncertainty associated with a respective elevation of the set of elevations. In some examples, the one or more messages indicate the geolocation information of the AP and the set of elevations associated with the AP.

The processing component 1110 is capable of, configured to, or operable to process a set of building data to determine the building height, the set of building data including a set of multiple building locations and a set of multiple building heights corresponding to a set of multiple buildings within a geographical area of the AP.

In some examples, to support processing the set of building data, the building height component 1112 is capable of, configured to, or operable to determine a maximum building height corresponding to one of the set of multiple buildings within the geographical area to determine the building height.

In some examples, to support processing the set of building data, the processing component 1110 is capable of, configured to, or operable to associate a data file of the set of building data to latitude and longitude coordinates corresponding to the geographical area of the AP to determine a maximum building height.

In some examples, the message component 1102 is capable of, configured to, or operable to receive one or more messages indicating air pressure information and geolocation information of an AP. In some examples, the elevation component 1104 is capable of, configured to, or operable to estimate a set of one or more elevations associated with the AP based on determining a height corresponding to the indicated air pressure information. In some examples, the parameter component 1106 is capable of, configured to, or operable to transmit an indication of a set of one or more transmission parameters for the AP that are associated with one or more of the set of elevations.

In some examples, the set of one or more transmission parameters includes one or more transmit powers, one or more channels for the AP associated with the transmit power, or one or more frequencies for the AP associated with the transmit power, or any combination thereof.

In some examples, the elevation component 1104 is capable of, configured to, or operable to receive the one or more message indicating the air pressure information, the geolocation information, and temperature information of the AP, the determined height corresponding to the indicated air pressure information and the indicated temperature information.

In some examples, the elevation component 1104 is capable of, configured to, or operable to determine reference air pressure information based on the geolocation information of the access point. In some aspects, the elevation component 1104 is capable of, configured to, or operable to determine the height based on the indicated air pressure information, temperature information, and the determined reference air pressure information.

In some examples, to support estimating the set of elevations, the elevation component 1104 is capable of, configured to, or operable to retrieve the reference air pressure information from a database based on the indicated geolocation information.

In some examples, to support estimating the set of elevations, the elevation component 1104 is capable of, configured to, or operable to determine the reference air pressure information using a relationship that is based on the indicated temperature information, the indicated geolocation information, and the set of elevations.

In some examples, the building height component 1112 is capable of, configured to, or operable to transmit an indication of the set of elevations associated with the access point based on estimating the set of elevations.

Figure 12:
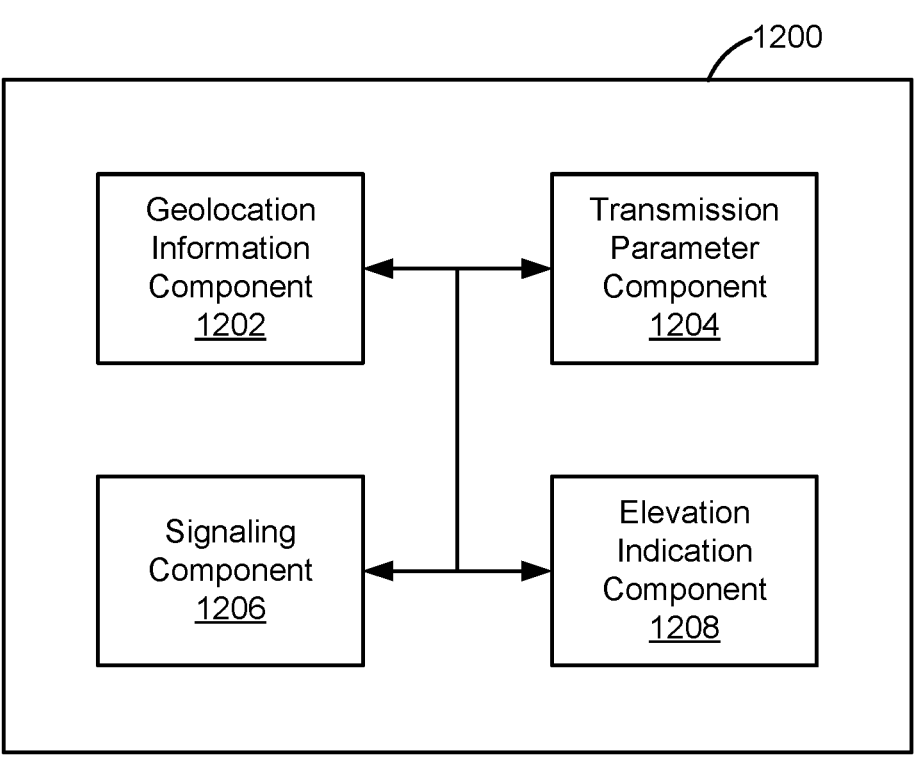
FIG. 12 shows a block diagram of an example wireless communication device that supports elevation estimation for determining operating channels and transmission parameters.

FIG. 12 shows a block diagram of an example wireless communication device 1200 that supports elevation estimation for determining operating channels and transmission parameters according to some aspects of the present disclosure. In some examples, the wireless communication device 1200 is configured or operable to perform the process 700 described with reference to FIG. 7. In various examples, the wireless communication device 1200 can be a chip, SoC, chipset, package or device that may include: one or more modems (such as, a Wi-Fi (IEEE 1002.11) modem or a cellular modem such as 3GPP 4G LTE or 5G compliant modem), one or more processors, processing blocks or processing elements (collectively "the processor"); one or more radios (collectively "the radio"); and one or more memories or memory blocks (collectively "the memory").

In some examples, the wireless communication device 1200 can be a device for use in an AP, such as an AP 102 described with reference to FIG. 1. In some other examples, the wireless communication device 1200 can be a STA that includes such a chip, SoC, chipset, package or device as well as multiple antennas. The wireless communication device 1200 is capable of transmitting and receiving wireless communications in the form of, for example, wireless packets. For example, the wireless communication device can be configured or operable to transmit and receive packets in the form of physical layer PPDUs and MPDUs conforming to one or more of the IEEE 1002.11 family of wireless communication protocol standards. In some examples, the wireless communication device 1200 also includes or can be coupled with an application processor which may be further coupled with another memory. In some examples, the wireless communication device 1200 further includes a user interface (UI) (such as a touchscreen or keypad) and a display, which may be integrated with the UI to form a touchscreen display. In some examples, the wireless communication device 1200 may further include one or more sensors such as, for example, one or more inertial sensors, accelerometers, temperature sensors, pressure sensors, or altitude sensors.

The wireless communication device 1200 includes a geolocation information component 1202, a transmission parameter component 1204, a signaling component 1206, and an elevation indication component 1208. Portions of one or more of the components 1202, 1204, 1206, and 1208 may be implemented at least in part in hardware or firmware. For example, the transmission parameter component 1204 may be implemented at least in part by a modem. In some examples, at least some of the components 1202, 1204, 1206, and 1208 are implemented at least in part by a processor and as software stored in a memory. For example, portions of one or more of the components 1202, 1204, 1206, or 1208 can be implemented as non-transitory instructions (or "code") executable by the processor to perform the functions or operations of the respective module.

In some implementations, the processor may be a component of a processing system. A processing system may generally refer to a system or series of machines or components that receives inputs and processes the inputs to produce a set of outputs (which may be passed to other systems or components of, for example, the device 12001200). For example, a processing system of the device 12001200 may refer to a system including the various other components or subcomponents of the device 12001200, such as the processor, or a transceiver, or a communications manager, or other components or combinations of components of the device 12001200. The processing system of the device 12001200 may interface with other components of the device 12001200, and may process information received from other components (such as inputs or signals) or output information to other components. For example, a chip or modem of the device 12001200 may include a processing system, a first interface to output information and a second interface to obtain information. In some implementations, the first interface may refer to an interface between the processing system of the chip or modem and a transmitter, such that the device 12001200 may transmit information output from the chip or modem. In some implementations, the second interface may refer to an interface between the processing system of the chip or modem and a receiver, such that the device 12001200 may obtain information or signal inputs, and the information may be passed to the processing system. A person having ordinary skill in the art will readily recognize that the first interface also may obtain information or signal inputs, and the second interface also may output information or signal outputs.

The geolocation information component 1202 is capable of, configured to, or operable to transmit one or more messages indicating geolocation information of the AP and indicating a set of one or more elevations associated with the AP based on the geolocation information. In some examples, the one or more messages indicate the geolocation information of the AP and the set of elevations associated with the AP.

The transmission parameter component 1204 is capable of, configured to, or operable to receive an indication of a set of one or more transmission parameters for the AP from a wireless communication device based on the indicated geolocation information and the set of elevations, the set of elevations based on a determined building height.

In some examples, the set of one or more transmission parameters includes one or more transmit powers, one or more channels for the AP associated with the transmit power, or one or more frequencies for the AP associated with the transmit power, or any combination thereof.

The signaling component 1206 is capable of, configured to, or operable to receive an indication of the geolocation information retrieved from a database from the wireless communication device in response to transmitting the one or more messages.

The elevation indication component 1208 is capable of, configured to, or operable to receive an indication of the set of elevations associated with the AP from the wireless communication device, the indication of the set of elevations including an uncertainty associated with a respective elevation of the set of elevations.

Implementation examples are described in the following numbered clauses:

Aspect 1: A method for wireless communication at a wireless communication device, comprising: receiving one or more messages indicating geolocation information of an AP; estimating a set of one or more elevations associated with the AP based at least in part on determining a building height corresponding to the indicated geolocation information; and transmitting an indication of a set of one or more transmission parameters for the AP that are associated with one or more of the set of elevations.

Aspect 2: The method of aspect 1, further comprising: transmitting an indication of the geolocation information to the AP in response to receiving the one or more messages based at least in part on retrieving the geolocation information from a database.

Aspect 3: The method of any of aspects 1 through 2, further comprising: transmitting an indication of the set of elevations associated with the AP based at least in part on estimating the set of elevations, the indication of the set of elevations comprising an uncertainty associated with a respective elevation of the set of elevations.

Aspect 4: The method of any of aspects 1 through 3, wherein the set of one or more transmission parameters comprises one or more transmit powers, one or more channels for the AP associated with the transmit power, or one or more frequencies for the AP associated with the transmit power, or any combination thereof Aspect 5: The method of any of aspects 1 through 4, wherein the one or more messages indicate the geolocation information of the AP and the set of elevations associated with the AP.

Aspect 6: The method of any of aspects 1 through 5, further comprising: processing a set of building data to determine the building height, the set of building data comprising a plurality of building locations and a plurality of building heights corresponding to a plurality of buildings within a geographical area of the AP.

Aspect 7: The method of aspect 6, wherein processing the set of building data comprises: determining a maximum building height corresponding to one of the plurality of buildings within the geographical area to determine the building height.

Aspect 8: The method of any of aspects 6 through 7, wherein processing the set of building data comprises: associating a data file of the set of building data to latitude and longitude coordinates corresponding to the geographical area of the AP to determine a maximum building height.

Aspect 9: A method for wireless communication at an AP, comprising: transmitting one or more messages indicating geolocation information of the AP and indicating a set of one or more elevations associated with the AP based at least in part on the geolocation information; and receiving an indication of a set of one or more transmission parameters for the AP from a wireless communication device based at least in part on the indicated geolocation information and the set of elevations, the set of elevations based at least in part on a determined building height.

Aspect 10: The method of aspect 9, further comprising: receiving an indication of the geolocation information retrieved from a database from the wireless communication device in response to transmitting the one or more messages.

Aspect 11: The method of any of aspects 9 through 10, further comprising: receiving an indication of the set of elevations associated with the AP from the wireless communication device, the indication of the set of elevations comprising an uncertainty associated with a respective elevation of the set of elevations.

Aspect 12: The method of any of aspects 9 through 11, wherein the set of one or more transmission parameters comprises one or more transmit powers, one or more channels for the AP associated with the transmit power, or one or more frequencies for the AP associated with the transmit power, or any combination thereof.

Aspect 13: The method of any of aspects 9 through 12, wherein the one or more messages indicate the geolocation information of the AP and the set of elevations associated with the AP.

Aspect 14: A method for wireless communication at a wireless communication device, comprising: receiving one or more messages indicating air pressure information and geolocation information of an AP; estimating a set of one or more elevations associated with the AP based at least in part on determining a height corresponding to the indicated air pressure information; and transmitting an indication of a set of one or more transmission parameters for the AP that are associated with one or more of the set of elevations.

Aspect 15: The method of aspect 14, further comprising: receiving the one or more message indicating the air pressure information, the geolocation information, and temperature information of the AP, the determined height corresponding to the indicated air pressure information and the indicated temperature information.

Aspect 16: The method of any of aspects 14 through 15, further comprising: determining reference air pressure information based at least in part on the geolocation information of the AP; and determining the height based at least in part on the indicated air pressure information, temperature information, and the determined reference air pressure information.

Aspect 17: The method of aspect 16, wherein determining the reference air pressure information comprises: retrieving the reference air pressure information from a database based at least in part on the indicated geolocation information.

Aspect 18: The method of any of aspects 16 through 17, wherein determining the reference air pressure information comprises: determining the reference air pressure information using a relationship that is based at least in part on the indicated temperature information, the indicated geolocation information, and the set of elevations.

Aspect 19: The method of any of aspects 14 through 18, further comprising: transmitting an indication of the set of elevations associated with the AP based at least in part on estimating the set of elevations.

Aspect 20: The method of any of aspects 14 through 19, wherein the set of one or more transmission parameters comprises one or more transmit powers, one or more channels for the AP associated with the transmit power, or one or more frequencies for the AP associated with the transmit power, or any combination thereof.

Aspect 21: An apparatus for wireless communication at a wireless communication device, comprising a processor; and memory coupled with the processor and storing instructions executable by the processor to cause the apparatus to perform a method of any of aspects 1 through 8.

Aspect 22: An apparatus for wireless communication at a wireless communication device, comprising at least one means for performing a method of any of aspects 1 through 8.

Aspect 23: A non-transitory computer-readable medium storing code for wireless communication at a wireless communication device, the code comprising instructions executable by a processor to perform a method of any of aspects 1 through 8.

Aspect 24: An apparatus for wireless communication at an AP, comprising a processor; and memory coupled with the processor and storing instructions executable by the processor to cause the apparatus to perform a method of any of aspects 9 through 13.

Aspect 25: An apparatus for wireless communication at an AP, comprising at least one means for performing a method of any of aspects 9 through 13.

Aspect 26: A non-transitory computer-readable medium storing code for wireless communication at an AP, the code comprising instructions executable by a processor to perform a method of any of aspects 9 through 13.

Aspect 27: An apparatus for wireless communication at a wireless communication device, comprising a processor; memory coupled with the processor; and instructions stored in the memory and executable by the processor to cause the apparatus to perform a method of any of aspects 14 through 20.

Aspect 28: An apparatus for wireless communication at a wireless communication device, comprising at least one means for performing a method of any of aspects 14 through 20.

Aspect 29: A non-transitory computer-readable medium storing code for wireless communication at a wireless communication device, the code comprising instructions executable by a processor to perform a method of any of aspects 14 through 20.

As used herein, the term "determine" or "determining" encompasses a wide variety of actions and, therefore, "determining" can include calculating, computing, processing, deriving, investigating, looking up (such as via looking up in a table, a database or another data structure), inferring, ascertaining, measuring, and the like. Also, "determining" can include receiving (such as receiving information), accessing (such as accessing data stored in memory), transmitting (such as transmitting information) and the like. Also, "determining" can include resolving, selecting, obtaining, choosing, establishing and other such similar actions.

As used herein, a phrase referring to "at least one of" a list of items refers to any combination of those items, including single members. As an example, "at least one of: a, b, or c" is intended to cover: a, b, c, a-b, a-c, b-c, and a-b-c. As used herein, "or" is intended to be interpreted in the inclusive sense, unless otherwise explicitly indicated. For example, "a or b" may include a only, b only, or a combination of a and b.

As used herein, "based on" is intended to be interpreted in the inclusive sense, unless otherwise explicitly indicated. For example, "based on" may be used interchangeably with "based at least in part on," "associated with", or "in accordance with" unless otherwise explicitly indicated. Specifically, unless a phrase refers to "based on only 'a,'" or the equivalent in context, whatever it is that is "based on 'a,'" or "based at least in part on 'a,'" may be based on "a" alone or based on a combination of "a" and one or more other factors, conditions or information.

The various illustrative components, logic, logical blocks, modules, circuits, operations and algorithm processes described in connection with the examples disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the examples described in this disclosure may be readily apparent to persons having ordinary skill in the art, and the generic principles defined herein may be applied to other examples without departing from the spirit or scope of this disclosure. Thus, the claims are not intended to be limited to the examples shown herein, but are to be accorded the widest scope consistent with this disclosure, the principles and the novel features disclosed herein.

Additionally, various features that are described in this specification in the context of separate examples also can be implemented in combination in a single implementation. Conversely, various features that are described in the context of a single implementation also can be implemented in multiple examples separately or in any suitable subcombination. As such, although features may be described above as acting in particular combinations, and even initially claimed as such, one or more features from a claimed combination can in some aspects be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the examples described above should not be understood as requiring such separation in all examples, and it should be understood that the described program components and systems can generally be integrated together in a single software product or packaged into multiple software products.

What is claimed is:

1. A wireless communication device, comprising:
at least one processor; and
at least one memory coupled with the at least one processor and storing instructions executable by the at least one processor to cause the wireless communication device to:
receive one or more messages including geolocation information of an access point, the geolocation information indicating a latitude and a longitude for the access point;
retrieve, from a database comprising a plurality of maximum building heights for a plurality of geographical areas, a maximum building height for a geographical area corresponding to the latitude and the longitude for the access point, the geographical area comprising a plurality of buildings;
estimate an elevation range for a possible elevation of the access point based at least in part on the maximum building height; and
transmit an indication of a set of one or more transmission parameters for the access point that are supported for the elevation range, the set of one or more transmission parameters comprising one or more of a transmit power, a channel, or a frequency.

2. The wireless communication device of claim 1, wherein the instructions are further executable by the at least one processor to cause the wireless communication device to:
transmit an indication of the geolocation information to the access point in response to receiving the one or more messages based at least in part on retrieving the geolocation information from a database.

3. The wireless communication device of claim 1, wherein the instructions are further executable by the at least one processor to cause the wireless communication device to:
transmit an indication of the elevation range for the possible elevation of the access point based at least in part on estimating the elevation range, the indication of the elevation range for the possible elevation of the access point comprising a set of elevations and an uncertainty associated with a respective elevation of the set of elevations.

4. The wireless communication device of claim 1, wherein the one or more messages include the geolocation information of the access point and the elevation range for the possible elevation of the access point.

5. The wireless communication device of claim 1, wherein the instructions are further executable by the at least one processor to cause the wireless communication device to:
process a set of building data to determine a data file of the database, the set of building data comprising at least a plurality of building locations and a plurality of building heights corresponding to the plurality of buildings within the geographical area.

6. The wireless communication device of claim 5, wherein the instructions to process the set of building data are executable by the at least one processor to cause the wireless communication device to:
determine the maximum building height corresponding to the plurality of buildings within the geographical area.

7. The wireless communication device of claim 1, wherein:
the elevation range spans from a ground level to the maximum building height; and
the maximum building height is for a set of buildings within a proximity of the access point in accordance with the geolocation information of the access point.

8. The wireless communication device of claim 1, wherein the instructions are further executable by the at least one processor to cause the wireless communication device to:
cache, at a least recently used (LRU) cache of the wireless communication device, the maximum building height for the geographical area based at least in part on retrieving, from the database, the maximum building height for the geographical area.

9. An access point, comprising:
at least one processor; and
at least one memory coupled with the at least one processor and storing instructions executable by the at least one processor to cause the access point to:
transmit one or more messages including geolocation information of the access point, the geolocation information indicating a latitude and a longitude for the access point; and
receive an indication of a set of one or more transmission parameters for the access point that are supported for an elevation range for a possible elevation of the access point from a wireless communication device based at least in part on a maximum building height for a geographical area corresponding to the latitude and the longitude for the access point, the geographical area comprising a plurality of buildings, and the set of one or more transmission parameters comprising one or more of a transmit power, a channel, or a frequency.

10. The access point of claim 9, wherein the instructions are further executable by the at least one processor to cause the access point to:
receive an indication of the geolocation information retrieved from a database from the wireless communication device in response to transmitting the one or more messages.

11. The access point of claim 9, wherein the instructions are further executable by the at least one processor to cause the access point to:

receive an indication of the elevation range for the possible elevation of the access point from the wireless communication device, the indication of the elevation range for the possible elevation of the access point comprising a set of elevations and an uncertainty associated with a respective elevation of the set of elevations.

12. The access point of claim 9, wherein the one or more messages include the geolocation information of the access point and the elevation range for the possible elevation of the access point.

13. The access point of claim 9, wherein:

the elevation range spans from a ground level to the maximum building height; and the maximum building height for a set of buildings within a proximity of the access point in accordance with the geolocation information of the access point.

14. A wireless communication device, comprising:

at least one processor; and at least one memory coupled with the at least one processor and storing instructions executable by the at least one processor to cause the wireless communication device to:

receive one or more messages including air pressure information and geolocation information of an access point;

retrieve, from a database comprising a plurality of maximum building heights for a plurality of geographical areas, a maximum building height for a geographical area corresponding to the geolocation information for the access point, the geographical area comprising a plurality of buildings;

estimate an elevation range for a possible elevation of the access point based at least in part on a height corresponding to the air pressure information and the maximum building height; and transmit an indication of a set of one or more transmission parameters for the access point that are supported for the elevation range, the set of one or more transmission parameters comprising one or more of a transmit power, a channel, or a frequency.

15. The wireless communication device of claim 14, wherein the one or more messages further include temperature information of the access point, the height corresponding to the air pressure information, the maximum building height, and the temperature information.

16. The wireless communication device of claim 14, wherein the instructions are further executable by the at least one processor to cause the wireless communication device to:

determine reference air pressure information based at least in part on the geolocation information of the access point; and determine the height based at least in part on the air pressure information, temperature information, and the reference air pressure information.

17. The wireless communication device of claim 16, wherein the instructions to determine the reference air pressure information are executable by the at least one processor to cause the wireless communication device to:

retrieve the reference air pressure information from a database based at least in part on the geolocation information.

18. The wireless communication device of claim 16, wherein the instructions to determine the reference air pressure information are executable by the at least one processor to cause the wireless communication device to:

determine the reference air pressure information using a relationship that is based at least in part on the temperature information, the geolocation information, and the elevation range.

19. The wireless communication device of claim 14, wherein the instructions are further executable by the at least one processor to cause the wireless communication device to:

transmit an indication of the elevation range for the possible elevation of the access point based at least in part on estimating the elevation range.

20. The wireless communication device of claim 14, wherein:

the elevation range spans from a ground level to the maximum building height; and the maximum building height for a set of buildings within a proximity of the access point in accordance with the geolocation information of the access point.

21. The wireless communication device of claim 14, wherein the instructions are further executable by the at least one processor to cause the wireless communication device to:

cache, at a least recently used (LRU) cache of the wireless communication device, the maximum building height for the geographical area based at least in part on retrieving, from the database, the maximum building height for the geographical area.

22. A method for wireless communication at a wireless communication device, comprising:

receiving one or more messages including geolocation information of an access point, the geolocation information indicating a latitude and a longitude for the access point;

retrieving, from a database comprising a plurality of maximum building heights for a plurality of geographical areas, a maximum building height for a geographical area corresponding to the latitude and the longitude for the access point, the geographical area comprising a plurality of buildings;

estimating an elevation range for a possible elevation of the access point based at least in part on the maximum building height; and transmitting an indication of a set of one or more transmission parameters for the access point that are supported for the elevation range, the set of one or more transmission parameters comprising one or more of a transmit power, a channel, or a frequency.

23. The method of claim 22, further comprising:

transmitting an indication of the geolocation information to the access point in response to receiving the one or more messages based at least in part on retrieving the geolocation information from a database.

24. The method of claim 22, further comprising:

transmitting an indication of the elevation range for the possible elevation of the access point based at least in part on estimating the elevation range, the indication of the elevation range for the possible elevation of the access point comprising a set of elevations and an uncertainty associated with a respective elevation of the set of elevations.

25. The method of claim 22, wherein the one or more messages include the geolocation information of the access point and the elevation range for the possible elevation of the access point.

26. The method of claim 22, further comprising:

processing a set of building data to determine a data file of the database, the set of building data comprising at least a plurality of building locations and a plurality of building heights corresponding to the plurality of buildings within the geographical area.

27. The method of claim 26, wherein processing the set of building data comprises:

determining the maximum building height corresponding to the plurality of buildings within the geographical area.

28. The method of claim 22, wherein:

the elevation range spans from a ground level to the maximum building height; and the maximum building height for a set of buildings within a proximity of the access point in accordance with the geolocation information of the access point.

\* \* \* \* \*